(12) United States Patent
Newton

(10) Patent No.: US 11,741,807 B2
(45) Date of Patent: Aug. 29, 2023

(54) METHODS AND APPARATUS FOR A PUBLIC AREA DEFENSE SYSTEM

(71) Applicant: Frederick Lee Newton, Albuquerque, NE (US)

(72) Inventor: Frederick Lee Newton, Albuquerque, NM (US)

( * ) Notice: Subject to any disclaimer, the term of this patent is extended or adjusted under 35 U.S.C. 154(b) by 762 days.

(21) Appl. No.: 16/691,559

(22) Filed: Nov. 21, 2019

(65) Prior Publication Data

US 2020/0160831 A1     May 21, 2020

Related U.S. Application Data

(60) Provisional application No. 62/770,567, filed on Nov. 21, 2018, provisional application No. 62/797,443, filed on Jan. 28, 2019.

(51) Int. Cl.
| | |
|---|---|
| *H04B 1/02* | (2006.01) |
| *G08B 15/00* | (2006.01) |
| *G10K 11/34* | (2006.01) |
| *G01S 17/894* | (2020.01) |
| *G01S 7/481* | (2006.01) |
| *G08B 25/10* | (2006.01) |

(Continued)

(52) U.S. Cl.
CPC ............ *G08B 15/00* (2013.01); *G01S 7/4802* (2013.01); *G01S 7/4812* (2013.01); *G01S 17/894* (2020.01); *G06V 10/145* (2022.01); *G06V 40/166* (2022.01); *G08B 25/006* (2013.01); *G08B 25/10* (2013.01); *G10K 11/34* (2013.01)

(58) Field of Classification Search
CPC ..... G10K 11/34; G01S 17/894; G01S 7/4802; G01S 7/4812; G08B 25/006; G08B 25/10

USPC ........................................................ 367/138
See application file for complete search history.

(56) References Cited

U.S. PATENT DOCUMENTS

| | | |
|---|---|---|
| 5,072,342 A | 12/1991 | Minovitch |
| 5,549,220 A | 8/1996 | Whalen |

(Continued)

FOREIGN PATENT DOCUMENTS

| | | |
|---|---|---|
| CN | 103256857 B | 9/2015 |
| CN | 105783589 A | 7/2016 |

(Continued)

OTHER PUBLICATIONS

Wang et al., Improvements in the Power Performance of GaN HEMPT by using Quarternary InAlGaN Barrier Feb. 16, 2018; IEEE; Journal Feb. 16, 2018, pp. 360-364, vol. 6, 2018https://ieeexplore.ieee.org/stamp/stamp.jsp?tp=&amumber-8293769.

(Continued)

*Primary Examiner* — Naomi J Small

(57) ABSTRACT

A public area defense system, comprising a non-lethal reactive deterrence defense subsystem, an optical subsystem operably coupled to and in communication with the non-lethal reactive deterrence defense subsystem, and an acoustic subsystem operably coupled to and in communication with the non-lethal reactive deterrence defense subsystem. The public area defense system may further comprise a computer system in communication with each of the non-lethal reactive deterrence defense subsystem, the optical subsystem, and the acoustic subsystem, wherein each of the non-lethal reactive deterrence defense subsystem, the optical subsystem, and the acoustic subsystem are operable to interact with an actor

17 Claims, 12 Drawing Sheets

(51) Int. Cl.
*G01S 7/48* (2006.01)
*G08B 25/00* (2006.01)
*G06V 10/145* (2022.01)
*G06V 40/16* (2022.01)

(56) References Cited

U.S. PATENT DOCUMENTS

| | | | |
|---|---|---|---|
| 6,054,694 A | 4/2000 | Paustian | |
| 6,793,364 B2 | 9/2004 | Cramer et al. | |
| 6,876,302 B1* | 4/2005 | Steeves | G08B 15/004 340/572.1 |
| 7,928,900 B2 | 4/2011 | Fuller et al. | |
| 8,049,173 B1* | 11/2011 | Brown | H01Q 19/00 250/341.7 |
| 8,453,551 B2 | 6/2013 | Rosenberg et al. | |
| 9,450,310 B2* | 9/2016 | Bily | H01Q 15/0006 |
| 9,589,448 B1* | 3/2017 | Schneider | F41H 11/00 |
| 2005/0156743 A1* | 7/2005 | Gallivan | F41H 13/0068 340/541 |
| 2006/0233215 A1 | 10/2006 | Casazza | |
| 2009/0254345 A1* | 10/2009 | Fleizach | G10L 13/00 704/260 |
| 2010/0128123 A1* | 5/2010 | DiPoala | G08B 13/19619 340/541 |
| 2013/0057693 A1* | 3/2013 | Baranek | G06V 40/166 348/152 |
| 2015/0334487 A1* | 11/2015 | Bowers | G10K 11/345 367/138 |
| 2017/0045336 A1* | 2/2017 | Crowe | F41H 9/00 |
| 2017/0337790 A1* | 11/2017 | Gordon-Carroll | H04L 67/12 |
| 2017/0350965 A1* | 12/2017 | Schmalenberg | G01S 7/4817 |
| 2018/0252506 A1 | 9/2018 | Hoboy | |
| 2019/0392693 A1* | 12/2019 | Franchi | G08B 15/02 |
| 2020/0027326 A1* | 1/2020 | Ravat | G08B 13/26 |

FOREIGN PATENT DOCUMENTS

| | | |
|---|---|---|
| WO | 2018/106437 A2 | 6/2018 |
| WO | WO 2018/169639 A1 | 9/2018 |

OTHER PUBLICATIONS

Thomas, Shane, Written Opinion of the International Searching Authority for application No. PCT/US19/62706 (Child of U.S. Appl. No. 16/691,559), dated Jan. 23, 2020, International Searching Authority, Alexandria, Virginia 22313-1450.

* cited by examiner

METHODS AND APPARATUS FOR A PUBLIC AREA DEFENSE SYSTEM

CROSS-REFERENCE TO RELATED APPLICATION

This application claims the benefit of provisional patent application 62/770,567 filed Nov. 21, 2018, which is incorporated herein in its entirety by reference.

BACKGROUND

In the last several years, there has been a large increase in the number of mass casualty events around the world. These include terrorist attacks, school shootings, church shootings, shootings at public events such as concerts and gatherings, and other acts of public violence. Such acts are difficult to defend against and may result in many injuries and fatalities.

Current active denial systems are extremely large and consume large amounts of power. Each such system can only be transported in the back of a vehicle. Further, the systems would require approximately 15 hours to heat to operating temperature and the temperature would then be required to be maintained with a high level of precision. The principal purpose of the systems was to affect crowd dispersal.

The inventor has developed a system of deterrence on an individual level and of defending public spaces, including schools, churches, theaters, cafeterias, libraries, shops, laboratories, indoor and outdoor auditoriums, gymnasiums, and other public gathering locations for children and adults.

SUMMARY OF THE INVENTION

Methods and apparatus are disclosed herein for a building defense and protection system that is intended to prevent or limit violence or harm to innocent individuals. A public area defense system, comprising a non-lethal reactive deterrence defense subsystem, an optical subsystem operably coupled to and in communication with the non-lethal reactive deterrence defense subsystem, and an acoustic subsystem operably coupled to and in communication with the non-lethal reactive deterrence defense subsystem. The public area defense system may further comprise a computer subsystem in communication with each of the non-lethal reactive deterrence defense subsystem, the optical subsystem, and the acoustic subsystem, wherein each of the non-lethal reactive deterrence defense subsystem, the optical subsystem, and the acoustic subsystem is operable to interact with an actor in advance of a violent attack or at least during the earliest possible phases in the escalation of an argument or unprovoked aggression culminating in violent actions.

Further, a method of deterring an actor in a public area is disclosed. The method may comprise receiving at least one of an optical data through an optical subsystem and an acoustic data through an acoustic subsystem. The method may further comprise sending the at least one of an optical data and an acoustic data to a computer system. The method may further comprise receiving, at a computer system, the at least one of an optical data and an acoustic data. Further, the method may comprise processing the at least one of an optical data and an acoustic data. The method may also comprise determining, at a computer, a threat level to the public area by the at least one of an optical data and an acoustic data to the public area. Determining may comprise comparing the at least one of an optical data and an acoustic data to known optical data and known acoustic data stored in a database accessible by the computer system. Determining may further comprise recognizing any matches between the at least one of an optical data and an acoustic data and the known optical data and the known acoustic data stored in the database accessible by the computer system. Determining may further comprise assigning a first threat level to the matches of the at least one of an optical data and an acoustic data based on the recognized matches. The method may further comprise determining an appropriate response based on at least one of the first threat level or the second threat level, and upon determining the appropriate response, sending an instruction, by the computer system, the instruction containing the appropriate response, to at least one of the acoustic subsystem and a non-lethal reactive deterrence subsystem to carry out the instruction.

DETAILED DES CRIPTOIN OF THE DRAWINGS

Figure 1:
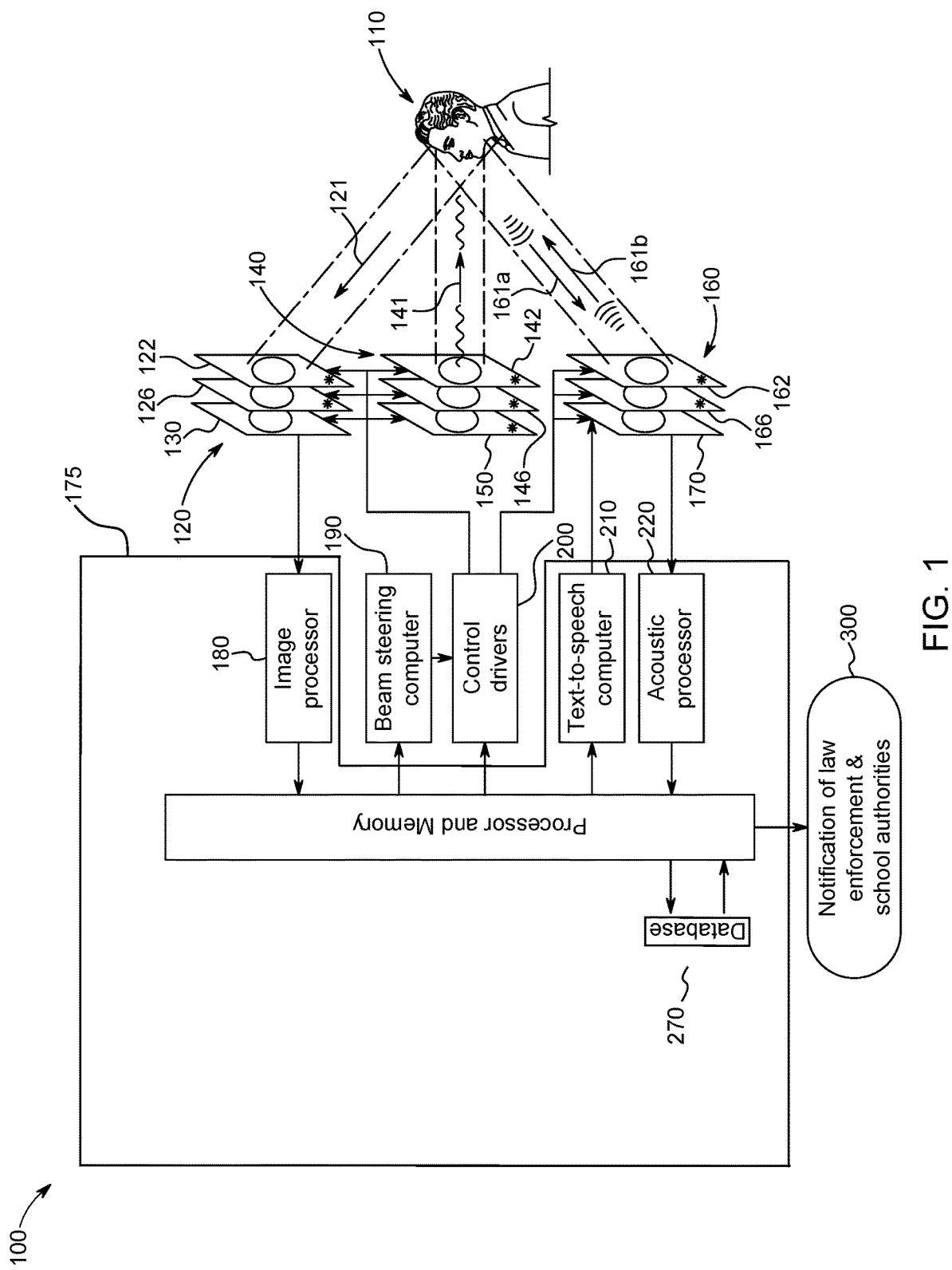
FIG. 1 illustrates a public area defense system.

A first embodiment of the public area defense system is referred to in FIG. 1. FIG. 1 illustrates a defense system 100. Defense system 100 may act to deter an actor 110. Actor 110 may pose some type of threat to a population. The threat could be violent in nature. Actor 110 may refer to multiple actors in multiple locations within the public area.

Defense system 100 may comprise several subsystems that act in cooperation to deter actor 110. Defense system 100 may comprise an optical subsystem 120. Optical subsystem 120 may comprise a beam-steerer 122. The beam-steerer 122 may be operable to steer the transmitted and received infrared beams. It will be understood that the term "beam" as used herein can refer to a beam of energy. The beam of energy may be a wave, such as a millimeter wave. The beam-steerer 122 may comprise a metamaterial and may be operable to steer and direct incoming beams, as will be explained herein below.

Optical subsystem 120 may further comprise a beam-former 126 operably coupled with the beam-steerer 122. The beam-former may be operable to form and shape incoming beams of light or energy to a detector 130 operably coupled with the beam-former 126 and beam-steerer 122. The beam-former 126 may comprise a metamaterial. The beam-former 126 may receive a signal from a control driver subsystem

200. The signal may be an electrical signal, which may change the metamaterial, causing the beam-former 126 to form and shape a beam in a specific manner.

The beam-former 126 may, in some embodiments, be combined with the beam-steerer 122 as integrated metamaterials in the optical subsystem 120. In some embodiments, where the beam-former is not present, the detector 130 may be operably coupled directly to the beam-steerer 122.

Figure 4A:
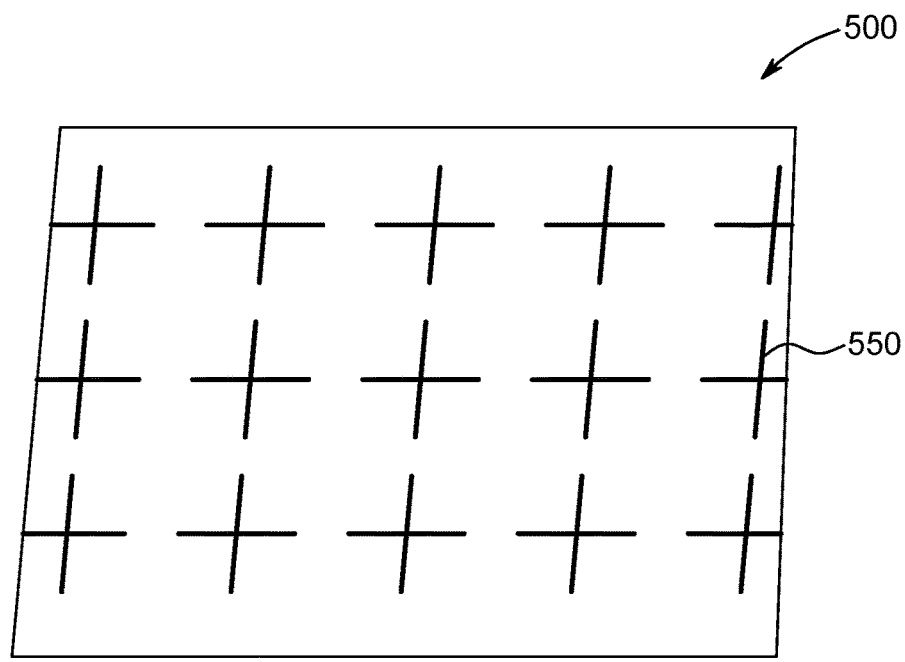
FIGS. 4A-4C illustrate a detailed view of a metamaterial optical beam-steering layer.
Figure 4B:
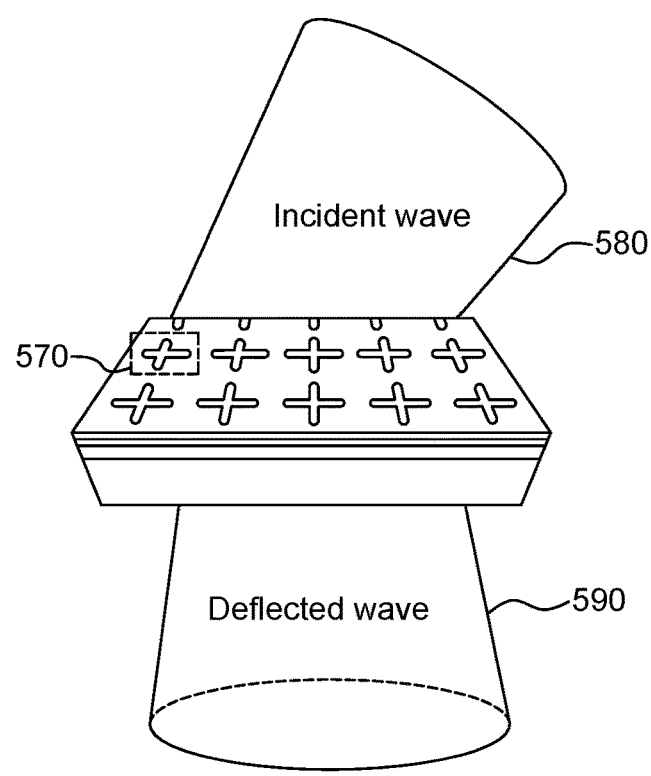
Figure 4C:
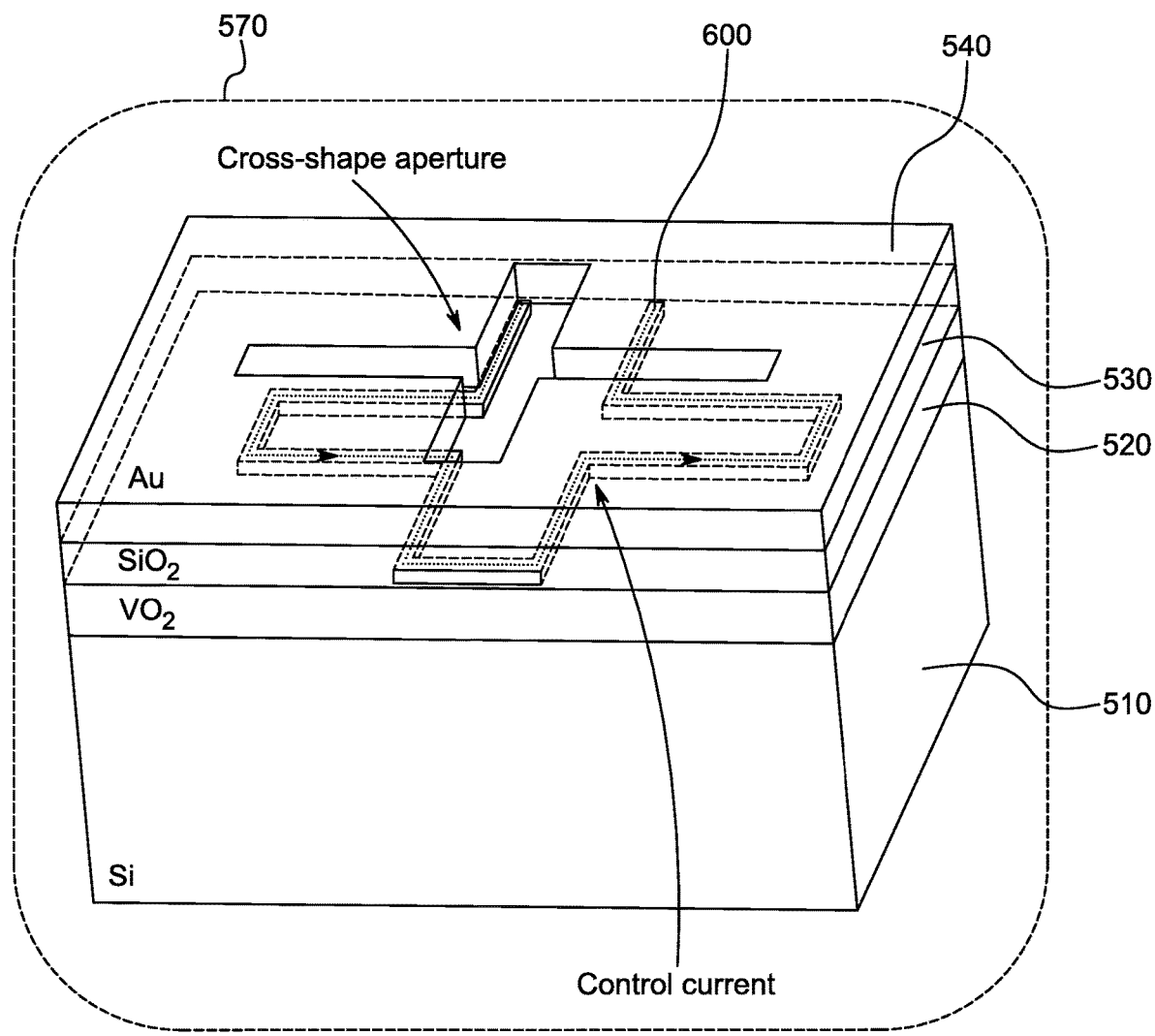

The optical beam-steerer 122 may comprise a metamaterial layer. In one embodiment, the metamaterial layer may comprise a gold-coated silicon dioxide layer on a silicon substrate, as illustrated in FIGS. 4A-4C. The metamaterials may comprise different materials in different embodiments. FIG. 4A illustrates metamaterial layer 500. Metamaterial layer 500 may comprise a silicone substrate 510. The silicone substrate 510 may be overlaid by a vanadium dioxide layer 520. The vanadium dioxide layer 520 may be overlaid by a silicon dioxide layer 530. The silicon dioxide layer 530 may be overlaid by a gold coating 540. The gold coating 540 may contain an array of apertures 550. Each aperture in the array of apertures 550 may be in a cross-shaped form, as illustrated. FIG. 4B illustrates wave 580 intersecting gold coating 540 and array of apertures 550. FIG. 4B further illustrates deflected wave 590 being deflected from the metamaterial layer 500. Cross member 570 is illustrated in expanded view in FIG. 4C. FIG. 4C illustrates an electrical current 600 in the silicon dioxide layer 530 around the aperture 570 on the underside of the gold coating 540 may cause incident wave 580 to be deflected as deflected wave 590 of FIG. 4B, so as to be normal to the optical detector 130 as it exits the silicon substrate 510.

The beam-steerer 122 may be operable to receive incoming beams of light or energy 121

The beam-steerer 122 may direct the optical beam 121 upon receiving a signal from the control driver subsystem 200. The signal may be an electrical signal which may cause the metamaterial to change and steer the beam in a specific direction. The optical beam 121 may comprise an image or video of the face or hands of actor 110 as a result of threatening voice or weapon action detected and classified by the computer subsystem 175, as will be explained herein below.

The optical image received by the beam-steerer 122 may be deflected by the azimuth and elevation angles of the beam-steerer 122 by an electrical current 600 in the silicon dioxide layer 530 under the gold coating 540. The deflection angle can be up to +/−90 degrees such that the deflected optical image beam 590 is normal to the optical detector 130, as described in "New Metamaterial Paves Way for Terahertz Technologies", Matthew Chin, under Professor Mona Jarrahi, UCLA Henry Samueli School of Engineering and Applied Science, Science+Technology, Oct. 21, 2016, which is incorporated herein by reference.

Optical subsystem 120 may be used to capture and receive images in and around a public space, including images of actor 110. The optical subsystem 120 may be in communication with other subsystems mentioned herein below, as will be explained later.

The optical detector 130 may comprise ultra-low-noise complimentary metal-oxide-semiconductor (CMOS) devices with ISOs equal to or greater than 100,000 and followed by event-based, analog, neuromorphic image processing for faster and more cost-effective analysis by the computer subsystem 175. The optical detectors 120 and processors and associated software within the computer subsystem 175 may be event-based software. This may comprise using each pixel of light collected to only report what it sees when it senses a significant change in its field of view, thereby reducing the amount of redundant data transmitted by a sensor and saving processing power, bandwidth, memory, and energy.

The detector 130 and the beam-steerer 122 are each in communication with the control driver subsystem 200 and receive inputs from the control driver subsystem 200. The inputs received direct the orientation of the incoming incident optical beam 121 into the beam-steerer 122, enabling the capture of optical images of interest by the optical detector 130.

The control driver subsystem 200 may comprise multiple control drivers. At least one of the multiple control drivers may be in respective communication with each of the following: detectors 130 and beam-steerers 122 to operate in an event-driven manner, which will increase the scan rate of the optical subsystem 120. In some embodiments, this may result in more frequent scans of an area or person of interest, such as for example, actor 110.

Further, the control driver subsystem 200 may be in communication with a beam-steering computer 190. The beam-steering computer 190 may receive inputs from the computer subsystem 175. These inputs may comprise information regarding the position of actor 110. The position of actor 110 may comprise a geocoded location of actor 110. The beam-steering computer 190 may be operable to receive the information from the computer subsystem 175 and may be operably coupled thereto. Further, the beam-steering computer may be operable to subsequently process the information received from the computer subsystem into a form suitable to provide instruction to the control driver subsystem 200. The commands may result in one or both of the detectors 130 and/or the beam-steerers 122 changing orientations or adjusting in order to be in a position to capture optical images of interest, including images of actor(s) 110. Other images of interest may include the surroundings of the area, objects such as weapons, other nearby actors or people of interest.

The control driver subsystem 200 may also be in direct communication with the computer subsystem 175. The computer subsystem 175 may provide information to the control driver subsystem 200 so as to prioritize target actors 110, their hands, and less frequent full-sector scans by the optical subsystem to detect any new events.

Further the optical subsystem 120 may be in communication with image processor 180. The optical subsystem 120 may transmit, through a transmitter, images captured by the detector 130 to the image processor 180 in the computer subsystem 175. The image processor 120 may be operable to process and configure the data received into various formats. The image processor 120 may be analog and neuromorphic, i.e. using large-scale integration systems containing electronic analog circuits to mimic neuro-biological architectures present in the nervous system. In further embodiments, the image processor may be in communication with the computer subsystem 175. The image processor 180 is operable to transmit, through a transmitter, the processed data from the image processor 180 to the computer subsystem 175. The computer 175 may comprise a processor a memory, transmitters, receivers, transceivers, and a database 270. Defense system 100 may further comprise a non-lethal reactive deterrence (NLRD) subsystem 140. The NLRD subsystem 140 may be operably coupled to the control driver subsystem 200 and may comprise a beam-steerer 142. NLRD subsystem 140 may further comprise a beam-former 146 that may be operably coupled with the beam-steerer 142, all of which may include metamaterials to reduce size, weight, power and cost at the operating frequency of approximately 95 GHz in the W-band. The NLRD subsystem 140 may further comprise a source 150 that may be operably coupled with the beam-former 146. The NLRD subsystem 140 may produce a transmitted beam of energy 141 that is non-lethal in nature. The beam of energy 141 may be directed to actor 110. The beam of energy may further be directed to a specific region of actor 110's body, such as the face, the chest, the arms, the right or left hand, or other area of actor 110's body. The beam of energy 141 may further cause actor 110 to experience pain in the region of actor 110's body affected by the beam of energy 141. Upon contact from the beam of energy 141 to the specific region of actor 110's body, actor 110 may experience pain in the form of extreme heat or other sharp and intense pain. In some embodiments, the NLRD subsystem 140 may produce and reproduce the beam of energy 141 one time for a period of 0.5 to 1.0 second or multiple times per second or multiple times over a period of seconds or minutes, depending upon the responses of actor 110, with the beam of energy 141 being sustained for any length of time between 0.1 second and 1 second. In further embodiments, the NLRD subsystem 140 may produce the beam of energy 141 for longer time spans, such as for 1 second, 1.5 seconds, 2 seconds, or for any amount of time therebetween determined through clinical trials to be effective without causing permanent injuries and as legally authorized by government authorities with jurisdiction. In further embodiments, the beam of energy 141 may be sustained for longer than 2 seconds. The beam of energy 141 may be directed or targeted to different regions of actor 110's body. The pain caused in actor 110 by the beam of energy 141 may cause actor 110 to cease whatever activity actor 110 is participating in. Further, it may cause actor 110 to retreat to an area designated by defense system 100. Further, the NLRD subsystem 140 may continue to produce the beam of energy 141 in order to maintain the retreated position of actor 110.

The beam-steerer 142 may comprise a metamaterial layer similar to beam-steerer 122 but reversed in the direction that energy flows. The metamaterial layer may be a vanadium dioxide layer coated with gold having a plurality of cross-shaped apertures, all on a silicon substrate. The metamaterial layer comprising the beam-steerer 142 may be any other composite materials functioning in a similar manner. The beam-steerer 142 acts to direct the beam of energy 141 to a desired location. The beam-steerer 142 may be in communication with the control drivers 200, which may be operable to provide instruction and direction as to where the beam of energy 141 should be directed. The metamaterial layer of the beam-steerer 142 may then be adjusted in order to direct the beam of energy 141 in the desired direction.

The beam-former 146 may comprise a metamaterial layer. The metamaterial beam-former 146 layer may comprise gold or graphene metal-coatings over vanadium dioxide on a silicon substrate to couple to the source 150 and to the beam-steerer 142. The metamaterial layer comprising the beam-former 146 may be any other composite materials functioning in a similar manner. The beam-former 146 may be in communication with the control drivers 200, which may be operable to provide instruction and direction as to where the beam of energy 141 should be directed and the intensity of the beam.

The beam-former 146 may be operable to form the beam of energy 141 in a form specified by the computer subsystem 175 via the control drivers 200. The beam-former 146 may form the beam of energy 141 such that beam 141 is a focused beam capable of being directed at a specific portion of actor 110's body.

The source and power amplifier 150 may comprise a MIMIC's array of GaN power amplifiers conditioned by a metamaterial output network. The power amplifier 150 may comprise gallium nitride, or other series 3 and series 5 elements such as, for example, aluminum and indium. The source may comprise a solid-state device operating in the W-band at approximately 95 GHz. In other embodiments, the source may comprise a solid-state device operating in a range from 90-100 GHz or any frequency approved by a government with jurisdiction to produce reactive deterrence pain without permanent injury or death. The source may, for example, comprise power transistors. This may result in a solid-state device being operable to produce a FET source output of 20 Watts/MM of gate width. Such a production is adequate to produce the beam necessary to deter actor 110 from actions with negative consequences by, for example, directing a beam resulting in ½ to 1 watt per square centimeter at the target for ½ second to 1 second. The target may comprise the body of actor 110 or, more particularly, the face of actor 110. The NLRD 140 subsystem may further be capable of creating, forming and steering a beam at other intensities for different durations.

The metamaterials used for the source 150 may be used to condition the output, compare and shift phase of individual power amplifier elements, and trap spurious harmonics to maximize the power added efficiency of the NLRD power amplifier. The metamaterials may comprise concentric split-ring oscillators to trap first and third harmonics and send the energy back to the amplifier input to improve efficiency. This is further described in provisional application 62/797,443 filed on Jan. 28, 2019, which is incorporated herein in its entirety by reference.

The beam-steerer 142, the beam-former 146, and the source 150 may each be in communication with the control driver subsystem 200. The control driver subsystem 200 may be operable to provide direction, input, and signals received from the beam-steering computer 190 and the computer subsystem 175.

Defense system 100 may further comprise an acoustic subsystem 160. Acoustic subsystem 160 may comprise a beam-steerer 162. Acoustic subsystem 160 may further comprise a beam-former 166 that may be operably coupled with the beam-steerer 162. Acoustic subsystem 160 may further comprise a source/detector 170 that may be operably coupled with beam-former 166. The acoustic subsystem 160 may act to receive incoming audio information 161a. The incoming audio information 161a may comprise audio from actor 110, other individuals in the area, or other audible noise from the area such as weapon discharges from firearms or explosive devices. Further, the acoustic subsystem 160 may act to send audio signals 161b in the form of speech from a text-to-speech computer 210, which is explained in further detail herein below. The text-to-speech computer 210 may be operably coupled with the computer subsystem 175. Audio signals 161b may comprise deterrent language, directions to the actor 110, information regarding the arrival of local authorities, and other information.

The beam-steerer 162 may comprise a metamaterial layer. The metamaterial layer may comprise metals such as gold, aluminum, aerogel, plastics and graphene of various types and geometrical shapes to steer and focus the desired frequencies while blocking or absorbing unwanted frequencies. The metamaterial beam-steerer 162 points a narrow receiving beam 161a at the actor 110 of interest. By directing the beam to center on the target actor 110, the signal-to-noise ratio for the desired acoustic actor may be optimized.

The beam-former 166 may comprise a metamaterial layer. The metamaterial layer may comprise metals, plastics and graphene of various types and geometrical shapes with cavities and shapes to optimize the special geometry of the receiving or projected acoustic beam to maximize the signal-to-noise ratio. The beam-steerer 162 may receive a signal from a control driver, and the signal, such as an electrical signal, may cause the metamaterial to change the form of an outgoing or incoming beam. The beam may act to direct the audio signals 161b to the necessary location, typically towards the head of actor 110. The narrow transmitter acoustic beam is well-confined to the narrow beam and cannot be heard throughout the area as would be the case with a standard loudspeaker. The use of such a confined beam enables the public area defense system to be used in outdoor public areas without disturbing other parties living, working or just passing nearby.

The metamaterial layer may attenuate certain frequencies of sounds. This may result in varying the width of an acoustic beam, depending on the purpose during various phases of interaction with the actor 110. A very broad beam, such as 180 degrees in azimuthal coverage and 30 to 45 degrees in elevation may be produced, which may then be narrowed to only a few degrees to focus on a particular location or person, such as actor 110.

The source/detector 170 may comprise a layer having sources and detectors next to each other. The sources may comprise metamaterials in the form of composite piezoelectric crystals. The detectors of the source/detector 170 may comprise metamaterials in the form of piezoelectric arrays. Upon receiving a signal, the source/detector may produce a beam of energy used to capture or to send an acoustic signal.

The beam-steerer 162, the beam-former 166, and the source/detector 170 may each be in communication with the control driver subsystem 200. The control driver subsystem 200 may be operable to provide direction received from the artificial intelligence subsystem 230 to the source/detector 170, the beam-former 166, and the beam-steerer 162 regarding their respective functions.

Additionally, the acoustic subsystem 160 may be in communication with acoustic processor 220 and with text-to-speech computer 210. The acoustic subsystem 160 may transmit information received via the incoming audio information 161a, through a transmitter, to the acoustic processor 220. The acoustic processor 220 may be operable to process the information received and transmit that information, through a transmitter, to the computer subsystem 175 for processing and decision making.

The text-to-speech computer 210 may contain a memory and a processor. The text-to-speech computer 210 may be operable to receive information in the form of text from the computer subsystem 175. The text-to-speech computer 210 may further be operable to convert the information into audio signals in the form of speech in any language and dialect desired or other specific sound, as required. The text-to-speech computer 210 may further be operable to transmit the converted information to the acoustic subsystem 160. The beam-steerer 162, the beam-former 166, and the source 170, receiving information and direction from the control driver subsystem 200 and the text-to-speech subsystem 210, may be operable to produce and transmit beam 161b, providing further deterrence and direction to actor 110.

Additionally, all hardware may be contained or camouflaged behind a common piece of equipment, such as, for example, a message board, or an audio-visual system, either of which could be protected by bullet-proof glass. Furthermore, there may be multiple optical subsystems 120, NLRD subsystems 140, and acoustic subsystems 160 placed throughout the public space, giving full coverage of the space and operating together to provide the greatest deterrent effect. The entire defense system 100 may be augmented with "safe zones" comprising small compartments designed to isolate one or more actors who have behaved in an aggressive manner that threatens the life or safety of innocent subjects within the public area. Safe zones may comprise many fixed or portable designs and may include self-locking doors, bullet-proof walls, ventilation, two-way communications, and other features to secure a public area until law enforcement consisting of competent security personnel can arrive and assume command of the area and the isolated actor(s) 110.

Figure 2:
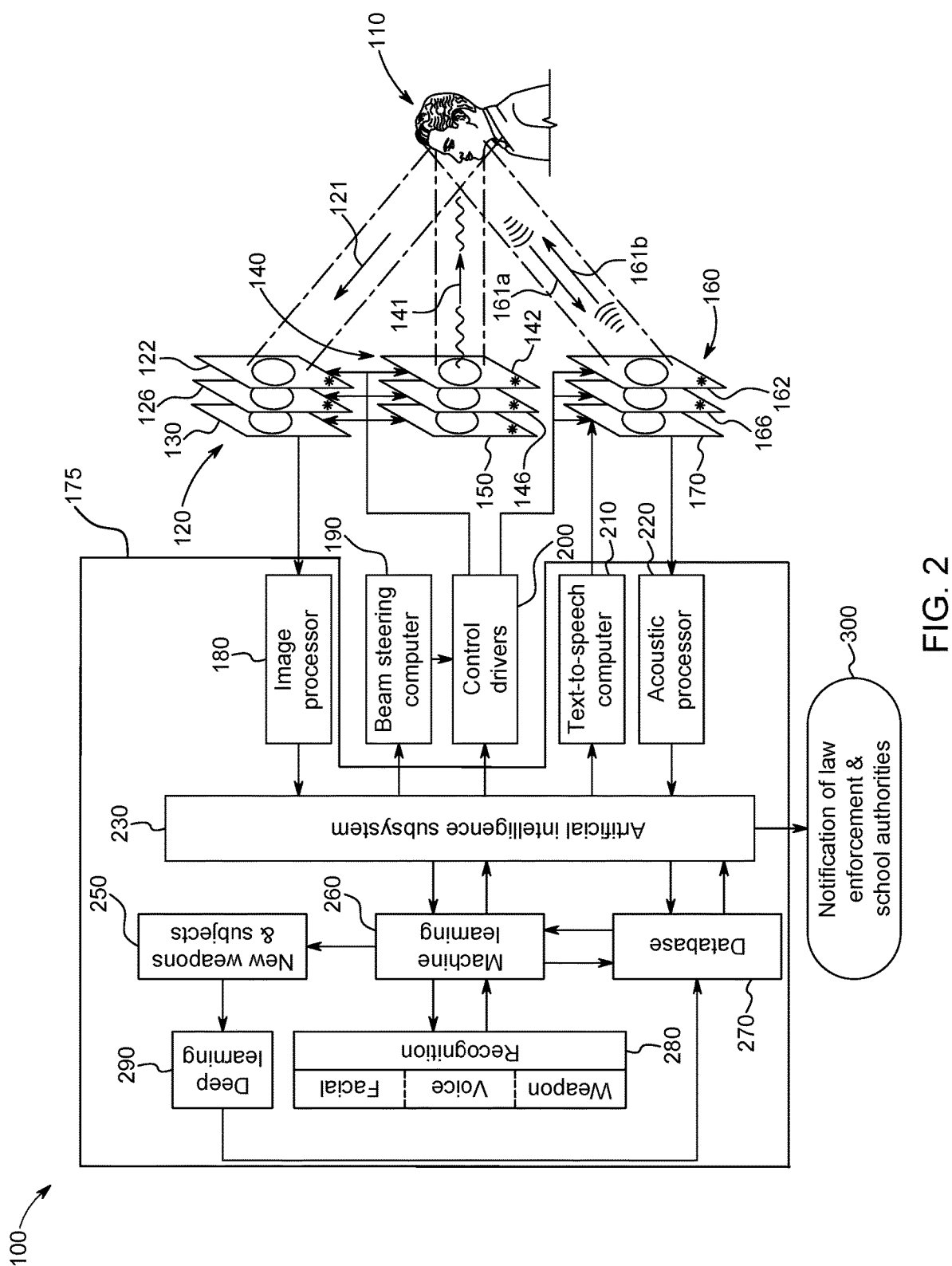
FIG. 2 comprises a further illustration of the public area defense system.

FIG. 2 illustrates a further embodiment of the computer subsystem 175. Specifically, the computer subsystem may comprise several subsystems for processing the data received from the optical subsystem 120 and the acoustic subsystem 160 and for processing and preparing instruction to go to the optical subsystem 120, the acoustic subsystem 160 and the NLRD subsystem 140.

For example, the computer subsystem 175 may comprise an artificial intelligence subsystem 230. The artificial intelligence subsystem 230 may be operable to receive data from the image processor 180 and the acoustic processor 160.

The artificial intelligence subsystem 230 may be operable to receive, at a receiver, inputs from various sources, including image processor 120, which may be neuromorphic, and acoustic processor 220. The artificial intelligence subsystem 230 may further be operable to receive inputs from machine learning subsystem 260 and from a database 270. The artificial intelligence subsystem 230 may be operable to use the data received from the machine learning subsystem 260 and the database 270 to produce accurate data to send to the reactive deterrence subsystem 190, the control drivers 200, and the text-to-speech computer 210.

The machine learning subsystem 260 may be operable to receive data from the artificial intelligence subsystem 230 and from database 270. Further, as will be explained hereinafter below, the machine learning subsystem 260 may be operable to receive data from and send data to a recognition subsystem 280. The machine learning subsystem 260 may be operable to use the data received to automate an analytic model of the public space and any developing situations, identify patterns, and make decisions as to what course of action may be necessary for a given threat or situation.

The database 270 may be operable to send and receive information to and from the artificial intelligence subsystem 230 and the machine learning subsystem 260. The database 270 may contain information regarding the identity of actor 110, the identification of weapons, information regarding the public space, and information regarding the first responders and other local law enforcement authorities from the community in which the public space is located. Further the database 270 may comprise information related to the actor 110's criminal and behavioral history. Furthermore, the database 270 may be operable to receive information from a deep learning subsystem 290.

The recognition subsystem 280 may be operable to receive information from the machine learning subsystem 260. The recognition subsystem 280 may further be operable to transmit information to the machine learning subsystem 260. The machine learning subsystem 260 may provide the recognition subsystem 280 with information from the optical subsystem 120 regarding images of faces or weapons or from the acoustic subsystem 160 regarding voice imprints, spoken threats and intonation or acoustic effects of a discharging weapon or weapons associated with one or more actors 110 or others in the public area. The recognition subsystem 280 can act to identify the actor(s) 110 primarily through highly accurate voice recognition or in some cases through facial recognition or more accurate 3D facial recognition from the optical subsystem 120. Facial recognition as referred to in this application may include using nodal biometrics that may be computed in three-dimensional space and may comprise mapping facial vein patterns in 3d. The recognition subsystem 280 may identify a weapon(s) using its database. The recognition subsystem 280 may further be operable to provide to or transmit to, via a transmitter, the machine learning subsystem 260 the identity of the actor 110 and/or the weapon actor 110 is using.

The new weapons and subjects subsystem 250 may be in communication with and receive data from the machine learning subsystem 260. This information may comprise images of actor 110 or images of any weapon being used by actor 110. The new weapons and subjects module may be operable to log the images and audio of the actor 110 and/or the weapon in actor's 110 possession. The new weapons and subjects subsystem 250 may further be operable to provide the deep learning subsystem 290 with the images and/or audio of the actor 110 and/or the weapon actor 110 is using.

The deep learning subsystem 290 may be operable to receive the information from the new weapons and subjects subsystem 250. The deep learning subsystem 290 may further be operable to process the information received to find new individuals, weapons, or behavior patterns of actors being observed. The deep learning subsystem 290 may be operable to provide newly classified weapons or newly identified subjects to the database 270.

After the artificial intelligence subsystem 230 has processed the data from the database 270 and the machine learning subsystem 260 regarding the situation and the identity of actor 110 and any weapon which the actor 110 may possess or display, the artificial intelligence subsystem 230 may provide a notification 295 to law enforcement and/or school authorities with the information relevant to the situation according to community law enforcement protocols and requirements of the owners or operators of the defended public space (school, theater, church, etc.).

The subsystems contained herein may further comprise neural network hardware, data storage, rechargeable battery back-up, local area network and internet interfaces.

Figure 3:
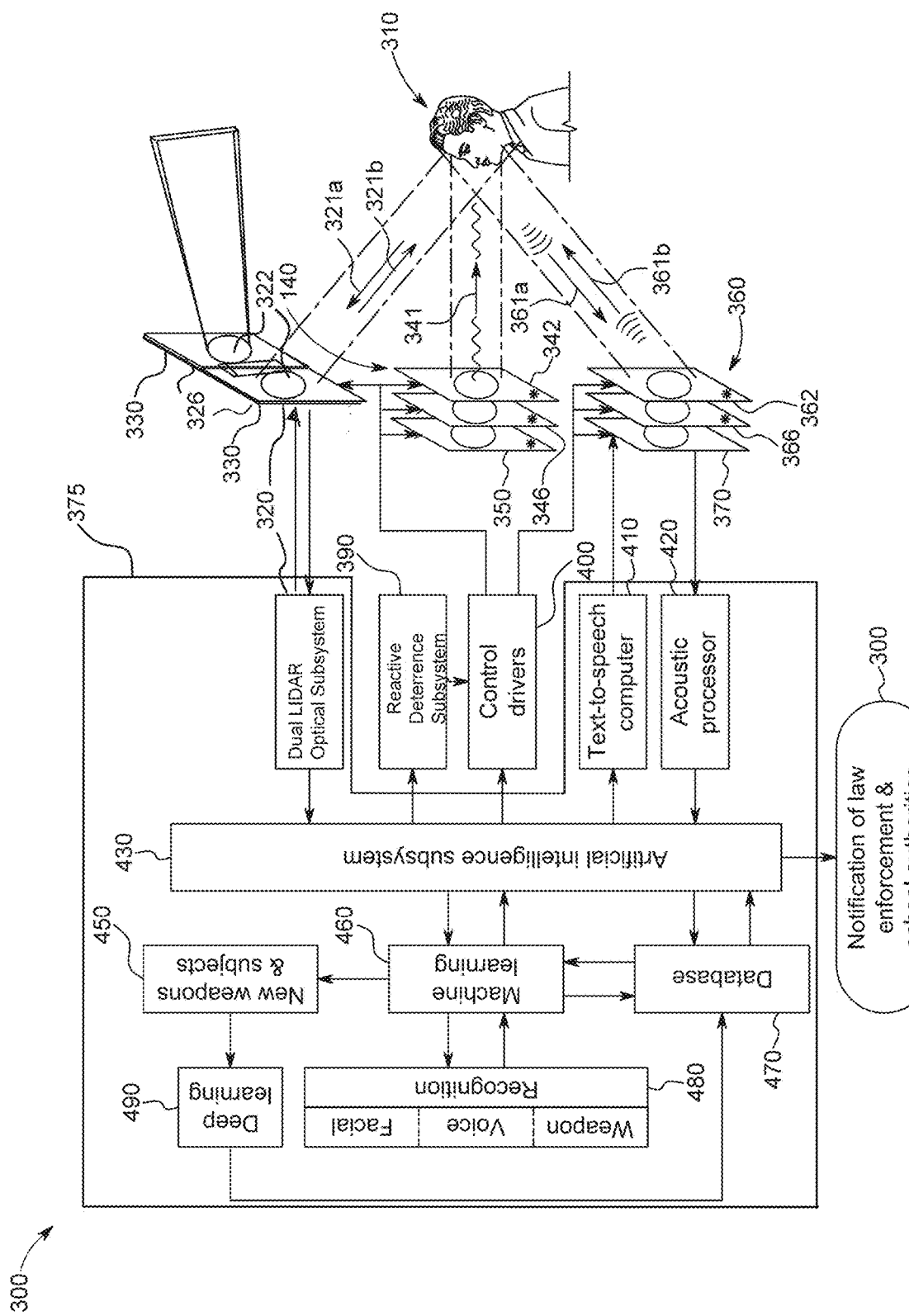
FIG. 3 illustrates a further embodiment of the public area defense system.

FIG. 3 illustrates a further embodiment of a public area defense system.

Defense system 300 may comprise several subsystems that act in cooperation to deter actor 310. Defense system 300 may comprise an optical Light Detection and Ranging (LiDAR) subsystem 320. Optical LiDAR system 320 may comprise multiple LiDAR units, such as two LiDAR units, as shown in FIG. 3. Optical LiDAR subsystem 320 may comprise one more metamaterials layers 322 to steer the transmitted and received infrared beams, which may be referred to as beam-steerer 322. Optical LiDAR subsystem 320 may further comprise a metamaterials beam-former 326 operably coupled with the beam-steerer 322. The beam-former 326 may, in some embodiments, be combined with the beam-steerer 322 as integrated metamaterials comprising the optical LiDAR subsystem 320. The optical subsystem 320 may further comprise a detector 330 operably coupled with the beam-former 326 and beam-steerer 322.

The LiDAR optical subsystem 320 may be operable to form and steer the beam 121a according to the disclosure herein. Further, the LiDAR optical subsystem may be operable to receive, via the beam-steerer 322, incoming optical beam 121b, which may comprise light reflected from a target, such as actor 310. This may then be transmitted to the computer system 375 for further processing.

The beam-steerer 322 may direct the outgoing optical LiDAR beam 321a directly at the face or hands of actor 310 that is targeted as a result of threatening voice or weapon action detected and classified by the artificial intelligence subsystem 430 from data received from the acoustic processor 420 and optical dual LiDAR 320 subsystems. The LiDAR optical image received by the beam-steerer 322 may be deflected by the azimuth and elevation angles of the beam-steerer 322 by up to +/−90 degrees such that the deflected optical image beam is normal to the optical detector 330.

The public area defense system 300 may utilize one or two optical LiDAR subsystems 330 to perform functions such as 3D facial imaging for the purpose of enhanced facial recognition through 3D imaging that produces more accurate facial contours through coverings of beards, hair, glasses, hats, scarves and burkas and/or 3D mapping of veins from near IR heat patterns measured from the reflected beams. The Optical LiDAR subsystem 320 may use metasurfaces similar to liquid crystals for beam-steering by reflecting near infrared (NIR) laser beams such that the reflected beams subtend a set angle. For the public area defense system, two small LiDAR subsystems 320 may be employed to cover a complete half cylinder in plan view so as to obtain imagery from all portions of a rectangular area such as a classroom, church sanctuary, laboratory, auditorium, gymnasium or corridor.

Optical LiDAR subsystem 320 may be used to capture and receive images in and around a public space, including images of actor 310. The optical LiDAR subsystem 320 may be in communication with other subsystems mentioned herein below, as will be explained later.

The optical detector 330 may comprise ultra-low-noise CMOS devices with ISOs equal to or greater than 100,000 and followed by event-based analog neuromorphic image processing for faster and more cost-effective analysis by the artificial intelligence subsystem 430. The optical detectors 320, artificial intelligence subsystem 430 and machine learning subsystem 460 may utilize event based software as described in this application The detector 330 and the beam-steerer 322 are each in communication with a control driver subsystem 200 and receive inputs from the control driver subsystem 400. The inputs received direct the orientation of the received incident optical beam 321a into the beam-steerer 322, enabling the capture of optical images of interest by the optical detector 330.

The control driver subsystem 400 may comprise multiple control drivers. At least one of the multiple control drivers may be in respective communication with each of the following: detectors 330 and beam-steerers 322 to operate in an event-driven mode that increases the scan rate of the dual LiDAR subsystems on targets that are moving while scan rates of the whole sector are much less frequent.

Further, the control driver subsystem 400 may be in communication with the reactive deterrence subsystem 390. The reactive deterrence subsystem 390 may receive inputs from the artificial intelligence subsystem 430. These inputs may comprise information regarding the geocoded location of actor 310 or multiple actors. The reactive deterrence subsystem 390 may be operable to receive the information from the artificial intelligence subsystem 430, and to subsequently process the information received into a form suitable to provide instruction to the control driver subsystem 400. The commands may result in one or both of the detectors 330 and/or the beam-steerers 322 changing orientations or adjusting in order to be in a position to capture optical images of interest, including images of actor 310. Other images of interest may include the surroundings of the area, objects such as weapons, other nearby actors or people of interest. The artificial intelligence subsystem 430 may control the time each of the two LiDAR subsystems are focused on the actor 310 versus on the task of change detection to record any new events.

The control driver subsystem 400 may also be in direct communication with the artificial intelligence subsystem 430. The artificial intelligence subsystem 430 may provide information to the control driver subsystem 400 so as to prioritize target actors 310, their hands, and less frequent full-sector scans to detect any new events.

The optical dual LiDAR subsystem 320 may transmit images captured by the detectors 330 to the image processor 320 in the computer subsystem 375. The image processor 320 is operable to process and configure the data received into various formats. The LiDAR image processor 320 may be analog and neuromorphic. In further embodiments, the LiDAR image processor 320 may be in communication with the artificial intelligence subsystem 430.

The artificial intelligence subsystem 430 may be operable to receive, at a receiver, inputs from various sources, including image processor 320, which may be neuromorphic, and acoustic processor 420, as will be described hereinafter below. The artificial intelligence subsystem 430 may further be operable to receive inputs from machine learning subsystem 460 and from a database 470. The artificial intelligence subsystem 430 may be operable to use the data received from the machine learning subsystem 460 and the database 470 to produce accurate data to send to the reactive deterrence subsystem 390, the control drivers 400, and the text-to-speech computer 410, as will be explained hereinafter below.

The machine learning subsystem 460 may be operable to receive data from the artificial intelligence subsystem 430 and from database 470. Further, as will be explained hereinafter below, the machine learning subsystem 460 may be operable to receive and send data from and to a recognition subsystem 480, as will be explained hereinafter below. The machine learning subsystem 460 may be operable to use the data received to automate an analytic model of the public space and any developing situations, identify patterns, and make decisions as to what course of action may be necessary for a given threat or situation.

The database 470 may be operable to send and receive information to and from the artificial intelligence subsystem 430 and the machine learning subsystem 460. The database 470 may contain information regarding the identify of actor 310, the identification of weapons, information regarding the public space, and information regarding the first responders and other local law enforcement authorities from the community in which the public space is located. Further, the database 470 may comprise information related to the actor 310's criminal and behavioral history. Furthermore, the database 470 may be operable to receive information from a deep learning subsystem 490.

The recognition subsystem 480 may be operable to receive information from the machine learning subsystem 460. The recognition subsystem 480 may further be operable to transmit information to the machine learning subsystem 460. The machine learning subsystem 460 may provide the recognition subsystem 480 with information from the dual LiDAR optical subsystem 320 regarding images of faces or weapons or from the acoustic subsystem 360 regarding voice imprints, spoken threats and intonation or acoustic effects of a discharging weapon or weapons associated with one or more actors 310 or others in the public area. The recognition subsystem 480 can act to identify the actor(s) 310 primarily through highly accurate voice recognition or in some cases through facial recognition or more accurate 3D facial recognition from the dual LiDAR optical subsystem 320. The recognition subsystem 480 may identify a weapon(s) using its database. The recognition subsystem 480 may further be operable to provide to or transmit to, via a transmitter, the machine learning subsystem 460 the identity of the actor(s) 310 and/or the weapon actor 310 is using.

The new weapons and subjects subsystem 450 may be in communication with and receive data from the machine learning subsystem 460. This information may comprise images of actor 310 or images of any weapon being used by actor 310. The new weapons and subjects module may be operable to log the images and audio of the actor 310 and/or images of the weapon in actor's 310 possession. The new weapons and subjects subsystem 450 may further be operable to provide the deep learning subsystem 490 with the images and/or audio of the actor 310 and/or the weapon actor 310 is using.

The deep learning subsystem 490 may be operable to receive the information from the new weapons and subjects subsystem 450. The deep learning subsystem 490 may further be operable to process the information received to find new individuals, weapons, or behavior patterns of actors being observed. The deep learning subsystem 490 may be operable to provide newly classified weapons or newly identified subjects to the database 470.

After the artificial intelligence subsystem 430 has processed the data from the database 470 and the machine learning subsystem 460 regarding the situation and the identity of actor 310 and any weapon which the actor 310 may possess or display, the artificial intelligence subsystem 430 may provide a notification 300 to law enforcement and/or school authorities with the information relevant to the situation according to community law enforcement protocols and requirements of the owners or operators of the defended public space (school, theater, church, etc.).

Reactive deterrence subsystem 390 may be operable to process and translate inputs from the artificial intelligence subsystem 430 into executable instructions. The reactive deterrence subsystem 390 controls NLRD subsystem 340. NLRD subsystem 340 may further comprise a source and amplifier 350 that may be operably coupled to a beam-former 346. The beam-former 346 may be operably coupled to a beam-steerer 342. Each of these members of the NLRD subsystem 340 may comprise metamaterials to reduce size, weight, power and cost at the operating frequency of approximately 95 GHz in the W-band.

The NLRD subsystem 340 may produce a transmitted beam of energy 341 that is non-lethal in nature. The beam of energy may be directed to actor 310. The beam of energy may further be directed to a specific region of actor 310's body, such as the face, the chest, the arms, the right or left hand, or other area of actor 310's body. The beam of energy 341 may further cause actor 310 to experience pain in the region of actor 310's body affected by the beam of energy 341. Upon contact from the beam of energy 341 to the specific region of actor 310's body, actor 310 may experience pain in the form of extreme heat or other sharp and intense pain. In some embodiments, the NLRD subsystem 340 may produce the beam of energy 341 one time for a period of 0.5 to 1.0 second or multiple times over a period of seconds or minutes, depending upon the responses of actor 310. In further embodiments, the NLRD subsystem 340 may produce the beam of energy 341 for longer time spans, such as for 1 second, 1.5 seconds, 2 seconds, or for any amount of time therebetween determined through clinical trials to be effective without causing permanent injuries and as legally authorized by government authorities with jurisdiction. In further embodiments, the beam of energy 341 may be sustained for longer than 2 seconds. The beam of energy 341 may be directed or targeted to different regions of actor 310's body. The pain caused in actor 310 by the beam of energy 341 may cause actor 310 to cease whatever activity actor 310 is participating in. Further, it may cause actor 310 to retreat to an area designated by defense system 300 or the NLRD subsystem 340 may continue to produce the beam of energy 341 in order to maintain the retreated position of actor 310.

The beam-steerer 342 may comprise a metamaterial layer which may be a vanadium dioxide layer coated with gold having a plurality of cross-shaped apertures, all on a silicon substrate. The metamaterial layer comprising the beam-steerer 342 may be any other composite materials functioning in a similar manner. The beam-steerer 342 acts to direct the beam of energy 341 to a desired location. The beam-steerer 342 may be in communication with the control drivers 400, which may be operable to provide instruction and direction as to where the beam of energy 341 should be directed. The metamaterial layer of the beam-steerer 342 may then be adjusted in order to direct the beam of energy 341 in the desired direction.

The beam-former 346 may comprise a metamaterial layer. The metamaterial beam-former 346 layer may comprise gold or graphene metal-coatings over vanadium dioxide on a silicon substrate to couple to the source 350 and to the beam-steerer 342. The metamaterial layer comprising the beam-former 346 may be any other composite materials functioning in a similar manner. The beam-former 346 may be in communication with the control drivers 400, which may be operable to provide instruction and direction as to where the beam of energy 341 should be directed and the intensity of the beam.

The beam-former 346 may be operable to form the beam of energy 341 in a form specified by the reactive deterrence subsystem 390 via the control drivers 400. The beam-former 346 may form the beam of energy 341 such that beam 341 is a focused beam capable of being directed at a specific portion of actor 310's body.

The source and power amplifier 350 may comprise a MIMIC's array of GaN power amplifiers conditioned by a metamaterial output network. The power amplifier 350 may comprise gallium nitride, or other series 3 and series 5 elements such as, for example, aluminum and indium. The source may comprise a solid-state device operating in the W-band at approximately 95 GHz. In other embodiments, the source may comprise a solid-state device operating in a range from 90-100 GHz or any frequency approved by a government with jurisdiction to produce reactive deterrence pain without permanent injury or death. Such a production is adequate to produce the beam necessary to deter actor 310 from actions with negative consequences by, for example, directing a beam of ½ to 1 watt per square centimeter for ½ to 1 second at the face of actor 310. The reactive deterrence subsystem 340 may further be capable of creating, forming and steering a beam at other intensities for different durations.

The beam-steerer 342, the beam-former 346, and the source 350 may each be in communication with the control driver subsystem 400. The control driver subsystem 400 may be operable to provide direction received from the reactive deterrence subsystem 390 and the artificial intelligence subsystem 430.

The NLRD subsystem 390 may be operable to redirect its beams to any additional target within a near-hemispherical volume in less than one microsecond and may direct the beam to many targets in a matter of seconds.

Defense system 300 may further comprise an acoustic subsystem 360. Acoustic subsystem 360 may comprise a beam-steerer 362. Acoustic subsystem 360 may further comprise a beam-former 366 that may be operably coupled with the beam-steerer 362. Acoustic subsystem 360 may further comprise a source/detector 370 that may be operably coupled with beam-former 366. The acoustic subsystem 360 may act to receive incoming audio information 361a. The incoming audio information 361a may comprise audio from actor 310, other individuals in the area, or other audible noise from the area such as weapon discharges from firearms or explosive devices. Further, the acoustic subsystem 360 may act to send audio signals 361b in the form of speech from a Text-to-Speech processor 410. Audio signals 361b may comprise deterrent language, directions to the actor 310, information regarding the arrival of local authorities, and other information.

The beam-steerer 362 may comprise a metamaterial layer. The metamaterial layer may comprise metals such as gold, aluminum, aerogel, plastics and graphene of various types and geometrical shapes to steer and focus the desired frequencies while blocking or absorbing unwanted frequencies. The metamaterial beam-steerer 362 points a narrow receiving beam 361a at the actor 310 of interest. By directing the beam to center on the target actor 310, the signal-to-noise ratio for the desired acoustic actor is optimized.

The beam-former 366 may comprise a metamaterial layer. The metamaterial layer may comprise metals, plastics and graphene of various types and geometrical shapes with cavities and shapes to optimize the special geometry of the receiving or projected acoustic beam to maximize the signal-to-noise ratio. The beam-steerer 362 acts to direct the audio signals 361b to the necessary location, typically towards the head of actor 310. The narrow transmitter acoustic beam is well-confined to the narrow beam and cannot be heard throughout the area as would be the case with a standard loudspeaker. The use of such a confined beam enables the public area defense system to be used in outdoor public areas without disturbing other parties living, working or just passing nearby.

The source/detector 370 may comprise a layer having sources and detectors next to each other. The sources may comprise metamaterials in the form of composite piezoelectric crystals. The detectors of the source/detector 370 may comprise metamaterials in the form of piezoelectric arrays.

The beam-steerer 362, the beam-former 366, and the source/detector 370 may each be in communication with the control driver subsystem 400. The control driver subsystem 400 may be operable to provide direction received from the artificial intelligence subsystem 430 to the source/detector 370, the beam-former 366, and the beam-steerer 362 regarding their respective functions.

Additionally, the acoustic subsystem 360 may be in communication with acoustic processor 420 and with text-to-speech computer 410. The acoustic subsystem 360 may transmit information received via the incoming audio information 361*a* to the acoustic processor 420. The acoustic processor 420 may be operable to process the information received and transmit that information to the artificial intelligence subsystem 430 for processing and decision making. The artificial intelligence subsystem 430, in connection with the database 470, the machine learning subsystem 460, the new weapons and subjects subsystem 450, the deep learning subsystem 490, and the recognition subsystem 480 will work to process the information from the acoustic subsystem 360 in a manner similar to the processing of the information from the optical subsystem 320.

The text-to-speech computer 410 may contain a memory and a processor. The text-to-speech computer 410 may be operable to receive information in the form of text from the artificial intelligence subsystem 430. The text-to-speech computer 410 may further be operable to convert the information into audio signals in the form of speech in any language and dialect desired or other specific sound, as required. The text-to-speech computer 410 may further be operable to transmit the converted information to the acoustic subsystem 360. The beam-steerer 362, the beam-former 366, and the source 370, receiving information and direction from the control driver subsystem 400 and the text-to-speech subsystem 410, may be operable to produce and transmit beam 361*b*, providing further deterrence and direction to actor 310.

Additionally, all hardware may be contained or camouflaged behind a common piece of equipment, such as, for example, a message board, or an audio-visual system, either of which could be protected by bullet-proof glass. Furthermore, there may be multiple optical subsystems 320, NLRD subsystems 340, and acoustic subsystems 360 placed throughout the public space, giving full coverage of the space and operating together to provide the greatest deterrent effect. The entire defense system 300 may be augmented with "safe zones" comprising small compartments designed to isolate one or more actors who have behaved in an aggressive manner that threatens the life or safety of innocent subjects within the public area. Safe zones may comprise many fixed or portable designs and may include self-locking doors, bullet-proof walls, ventilation, two-way communications, and other features to secure a public area until law enforcement consisting of competent security personnel can arrive and assume command of the area and the isolated actor(s) 310.

Methods of using the hardware and systems described herein below will now be described in detail. Reference is made to various figures previously described herein.

A method of deterring an actor in a public area is described. The actor may be actor 110, as referred to in FIGS. 1-3. As previously described, the actor 110 may refer to a single actor or multiple actors. The actor 110 may be a violent or a disruptive person or persons. The actor 110 may be interacting with other people or with property. Making reference now to FIG. 5, the method may comprise step 600, observing an acoustic activity within the public area. The observation referred to in step 600 may comprise making an observation by an acoustic subsystem, such as the acoustic subsystems described previously herein.

The method may further comprise, as described in step 610, receiving an acoustic data at an acoustic subsystem. The acoustic input may comprise acoustic data. The acoustic data may comprise a recording of the noise or sounds within the acoustic area. This may include a recording of voices, such as the voice of the actor or actors within the public area. The acoustic data may include conversations between several actors or people and may include any changes in volume or intonation of speech. The acoustic input or acoustic data may further include sounds produced by any weapon within the public area and any other sound produced within the public area.

The method may further comprise 620 sending the acoustic data from an acoustic subsystem. The acoustic data may be sent from the acoustic subsystem via wireless transmission, wired transmission, near field communication means, or other methods.

The method may further include 625 receiving at the computer subsystem the acoustic data.

The method may further include, as indicated by 630 processing the acoustic data at acoustic processor within the computer subsystem. Processing the acoustic data at an acoustic processor may comprise converting the received acoustic data into a form suitable for analysis, such as into digital form. The information may be zipped or sent in data packets to maximize efficiency and speed of data transfer.

In certain embodiments the method may further include 640 determining at a computer subsystem, a threat level to the public area that is presented by at least one of the optical data and the acoustic data.

Figure 5:
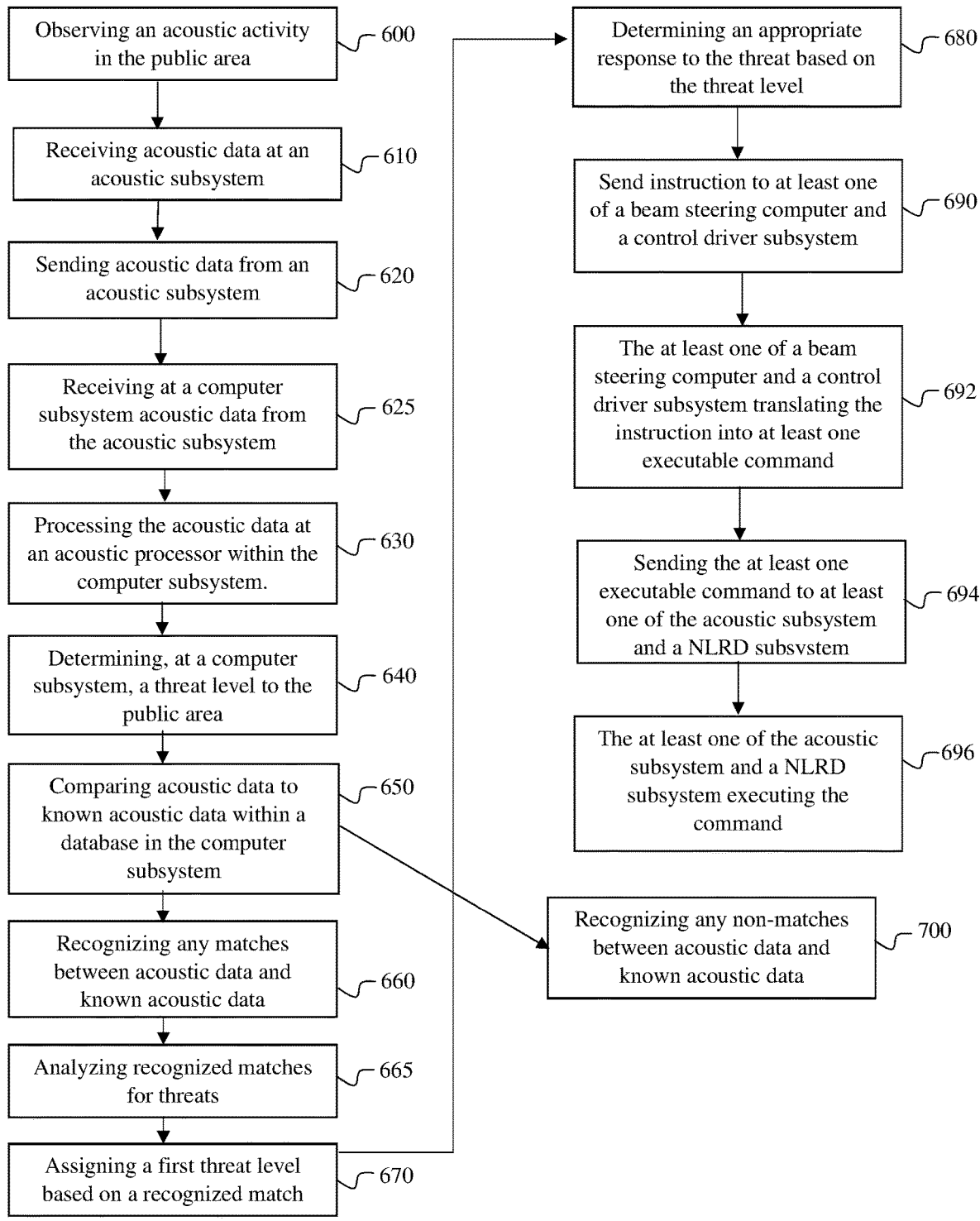
FIG. 5 illustrates a flow chart of certain aspects of the method of using the public area defense system.

In certain embodiments, determining a threat level to the public area from at least one of an optical data and acoustic data may comprise, as represented by 650 in FIG. 5, comparing the acoustic data to known acoustic data that is stored in a database within the computer subsystem. Comparing the acoustic data may comprise comparing voice prints to voice prints stored in the database to known individuals. These known individuals may be individuals who are members of a certain group, such as a group that regularly uses the public area. Such a group may include school faculty, school students, members of a club that owns or frequently uses the public area, members of a religious group that owns or frequently uses the public area. The known voice prints may be gathered by recording an individual's voice in a pre-arranged setting where the speakers identify themselves and provide their voice and facial identification to the public area defense system. Alternatively, the voice prints may be recorded by the computer subsystem, using the acoustic subsystem as described in other embodiments, to record voices. The optical subsystem, as described herein, can be used to obtain a visual recording of the face of the person speaking the words, and the computer subsystem may associate a face with a voice print. The face and voice print may then be stored in the database within the computer subsystem to recognize if a speaker is a regular attendee to the public area.

Further, the acoustic subsystem may gather acoustic data related to each individual having a voice print recorded in the database. For example, speech patterns and normal speaking volumes may be gathered by the acoustic subsystem and recorded in the database. This information may then be used as a baseline in determining any deviations from normal behavior when the computer subsystem is making a threat assessment in step 650 of FIG. 5.

In further embodiments, the database may comprise acoustic data of known threats. For example, the database may contain voice prints of felons or sex offenders known in the area gathered from law enforcement. Further, the database may store individual voice prints and patterns in acoustic data, such as an individual's speech, words used, volume, and intonation, gathered by the acoustic subsystem. Further, the database may store words and phrases typically used in altercations.

Additionally, the computer subsystem may continue to add data and information, such as voice prints and patterns in acoustic data, such as an individual's speech, words used, volume, and intonation, to its database to constantly improve and broaden its voice recognition and pattern recognition in determining threats and making threat assessments.

Comparing acoustic data to known acoustic data as shown in 650 may comprise the computer subsystem comparing voice prints to known voice prints and comparing patterns in acoustic data, such as an individual's speech, words used, volume, and intonation. Further comparing acoustic data to known acoustic data may further comprise comparing conversations between people to known conversational elements.

In certain embodiments, the method may further comprise step 660, recognizing any matches between voice prints and patterns in acoustic data, such as an individual's speech, words used, volume, and intonation with information stored in the database. Recognizing any matches may comprise 665, analyzing the data for a degree of similarity, such as for example, a 50% match, 60% match, a 70% match, an 80% match, a 90% match or a 100% match, or any percentage between these examples.

In certain embodiments the method may further comprise 700, recognizing any non-matches between acoustic data and known acoustic data. 700 and methods associated with non-matching data will be discussed herein below.

In certain embodiments the method may further comprise step 670, assigning a first threat level based on the recognized match from 660 and 665. Assigning the first threat level may comprise assigning a threat level based on the percentage match between observed acoustic data and acoustic data in the database. Assigning the first threat level may further comprise assigning a threat level based on who the threat is coming from. For example, if the actor, or the speaker who is the source of the acoustic data, is a known bad actor, then the computer subsystem may use this as a factor in assigning a threat level. In some instances, this could result in a higher threat level. Assigning the first threat level may further comprise considering prior history of assaults, weapon possessions, threats, drug use, family instability, etc. All these factors may contribute to a higher threat level being assigned and a lower tolerance of observed threats before acoustic and reactive deterrence subsystem action may be taken.

Further, the method may comprise 680, determining an appropriate response to the threat, based on the first threat level as determined and assigned in 670. The appropriate response will depend on the threat level, including who the actor is and if the actor has violent past or a propensity for violence or violent reactions or has social or family relationships known or suspected to cause anti-social or aggressive behavior. The appropriate response may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise using a system such as a non-lethal reactive deterrence subsystem as previously described herein, to direct a beam of energy at an actor's body or face to stop the threatening behavior.

The method may further comprise 690, upon determining the appropriate response, sending instruction to at least one of a beam-steering computer and to control drivers containing information regarding executing the appropriate response.

The method may further comprise 692, wherein at least one of the control drivers and the beam-steering computer translate the instruction to at least one executable command. The method may further comprise sending the at least one executable command to at least one of the acoustic subsystem and the non-lethal reactive deterrence subsystem (NLRD) to execute the appropriate response. As described herein related to other embodiments, the control drivers may provide executable commands to the sources, beam-steerers, and beam formers of various subsystems. The beam-steering computer provides instruction and direction to the beam-steering metamaterials.

Further as herein related to other embodiments, the artificial intelligence subsystem may determine that designated law enforcement or security personnel should be notified of an escalating interaction involving an actor or actors and consequently notify authorities. Alternatively or simultaneously, the artificial intelligence subsystem may activate control drivers to send a request or instruction to an actor or actors via the acoustic subsystem, or to increase or decrease frame rates of the actor or actors by the optical subsystem, or to activate the reactive deterrence subsystem to direct and send a 95 GHz beam at the face of an actor or at the hand of an actor holding a weapon.

The method may further comprise 694, sending the translated instruction or executable command to the at least one of the acoustic subsystem and the NLRD executing the command according to the command received from the control driver. The method may further comprise 696 the at least one of the acoustic subsystem and the NLRD executing the command according to the command received. This execution may comprise executing the appropriate response, which may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise sending using a system such as a non-lethal reactive deterrence subsystem as previously described herein, to direct a beam of energy at an actor's body or face to stop the threatening behavior.

Figure 6:
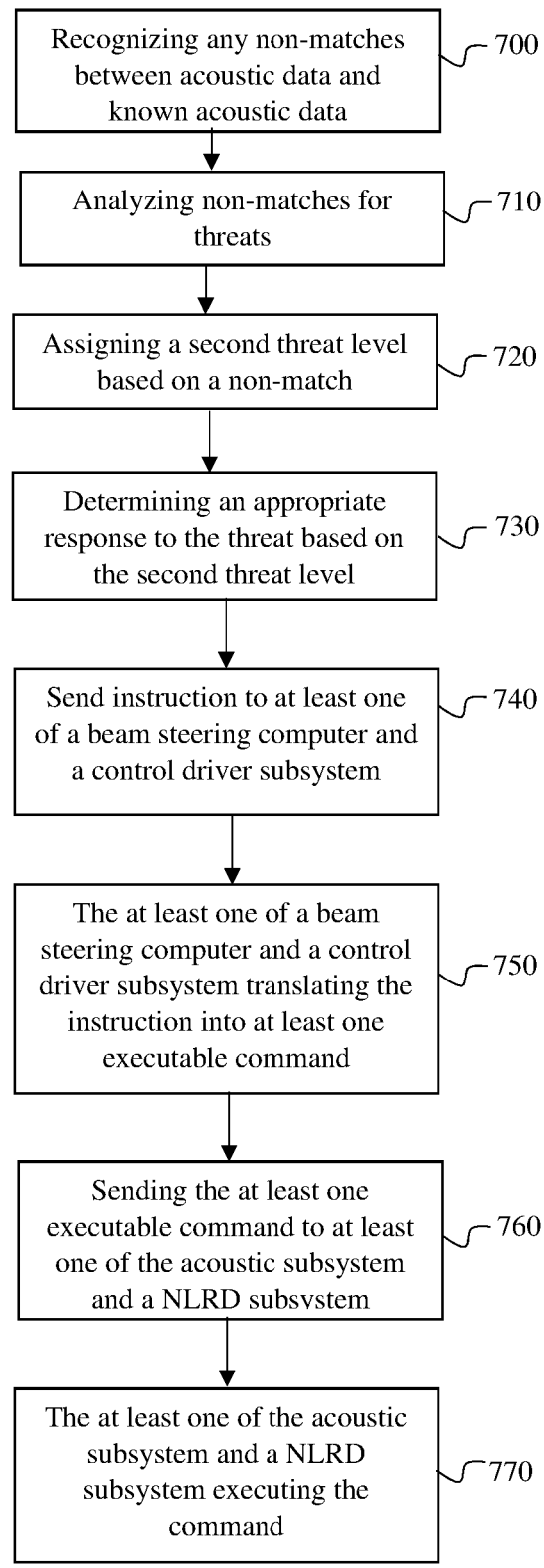
FIG. 6 illustrates a flow chart of certain aspects of the method of using the public area defense system.

In further embodiments, the method of determining a threat level to the public area from an acoustic data may comprise further determining a second threat level based on acoustic data. As illustrated in FIG. 6, the method may comprise receiving data as described in relation to FIG. 5. The method may further comprise, after comparing the received acoustic data to known acoustic data in the database, recognizing non-matching acoustic data, as in step 700. Or, in other words, as described herein, comparing received acoustic data to acoustic data found in the database and recognizing any received acoustic data that does not match stored acoustic data. Non-matching data may include voice print data that does not match any voice prints stored in the database, words or languages not recognized in the database, intonation and speech patterns not recognized in the database, and other non-recognized data.

In certain embodiments, the method may comprise step 700, recognizing any non-matches between voice prints and patterns in acoustic data, such as an individual's speech, words used, volume, and intonation with information stored in the database. Recognizing any non-matches may comprise recognizing a degree of dissimilarity, such as for example, a match between certain particular received acoustic data and stored acoustic data, such as voice prints, speech volume in context of the conversation and circumstances, speech intonation, language, and other elements. The degree of dissimilarity may, in some embodiments, be expressed as a percentage similarity, such as for example a similarity between received acoustic data and stored acoustic data less than a 70% match, less than a 60% match, less than a 50% match, less than a 40% match, less than a 30% match, less than a 20% match, less than a 10% match or any percentage between these exemplary examples.

Upon recognizing non-matching data, the computer subsystem may analyze the non-matching data. Analyzing the non-matching acoustic data may comprise analyzing the received acoustic data. For example, Analyzing the non-matching acoustic data may lead to comparisons of other available biometrics such as facial recognition based on nodal two-dimensional ratios for nodal pairs for various camera aspect angles. When the facial biometrics database and real-time camera subsystem both use active near-infrared 3D transmitters and receivers, nodal matching in 3D can be more accurate and facial vein patterns can also be used to achieve far greater accuracies in identification matching which is approximately as accurate as voice recognition biometrics.

In certain embodiments, the method may further comprise step 720, assigning a second threat level based on the analysis of the non-matching data in 710. Assigning the second threat level may comprise assigning a threat level based on analyzing non-matching data to determine the probability of a threat. Assigning the second threat level may further comprise assigning a threat level based on from whom the threat is coming. For example, if the actor, or the speaker who is the source of the acoustic data, is a known or a discovered bad actor, then the computer subsystem may use this as a factor in assigning a threat level. In some instances, this could result in a higher threat level. Assigning the second threat level may result in a faster deployment of the reactive deterrence subsystem's beam based on an artificial intelligence subsystem estimate of time-to-impact of an actor's aggressive action by use of a weapon or through striking a victim by hand or with some object. Non-lethal deterrence using the reactive deterrence subsystem becomes the primary objective whenever the estimated time-to-impact is too short for the acoustic subsystem to send a command that is likely to prevent or delay the actor from taking a threatened action.

Further, the method may comprise 730, determining an appropriate response to the threat, based on the second threat level as determined and assigned in 720. The appropriate response will depend on the threat level, possibly including who the actor is and if the actor has a violent past or a propensity for violence or violent reactions. The appropriate response may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise using a system such as a non-lethal reactive deterrence subsystem as previously described herein, to direct a beam of energy at an actor's body or face to stop the threatening behavior.

The method may further comprise 740 upon determining the appropriate response, sending instruction to at least one of a beam-steering computer and to control drivers containing information regarding executing the appropriate response.

The method may further comprise 750, wherein at least one of the control drivers and the beam-steering computer translate the instruction to at least one executable command. The method may further comprise sending the at least one executable command to at least one of the acoustic subsystem and the non-lethal reactive deterrence subsystem (NLRD) to execute the appropriate response. As described herein related to other embodiments, the control drivers control the sources, beam-formers, and beam-steerers of the various subsystems within the public area defense system 100, including the exact beam widths and steering of the NLRD subsystem and the acoustic subsystem. The beam-steering computer provides instruction and direction to the beam-steering metamaterials.

The method may further comprise 760, the at least one of the acoustic subsystem and the NLRD executing the command according to the command received. This execution may comprise executing the appropriate response, which may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise sending using a system such as a non-lethal reactive deterrence subsystem as previously described herein, to direct a beam of energy at an actor's body or face to stop the threatening behavior.

In further embodiments, additional means of receiving data and determining a threat may be utilized. For example, making reference now to FIG. 7, the method may comprise 800, observing visual activity within the public area. The observation referred to in 800 may comprise making an observation by an optical subsystem, such as the optical subsystem described herein above.

Figure 7:
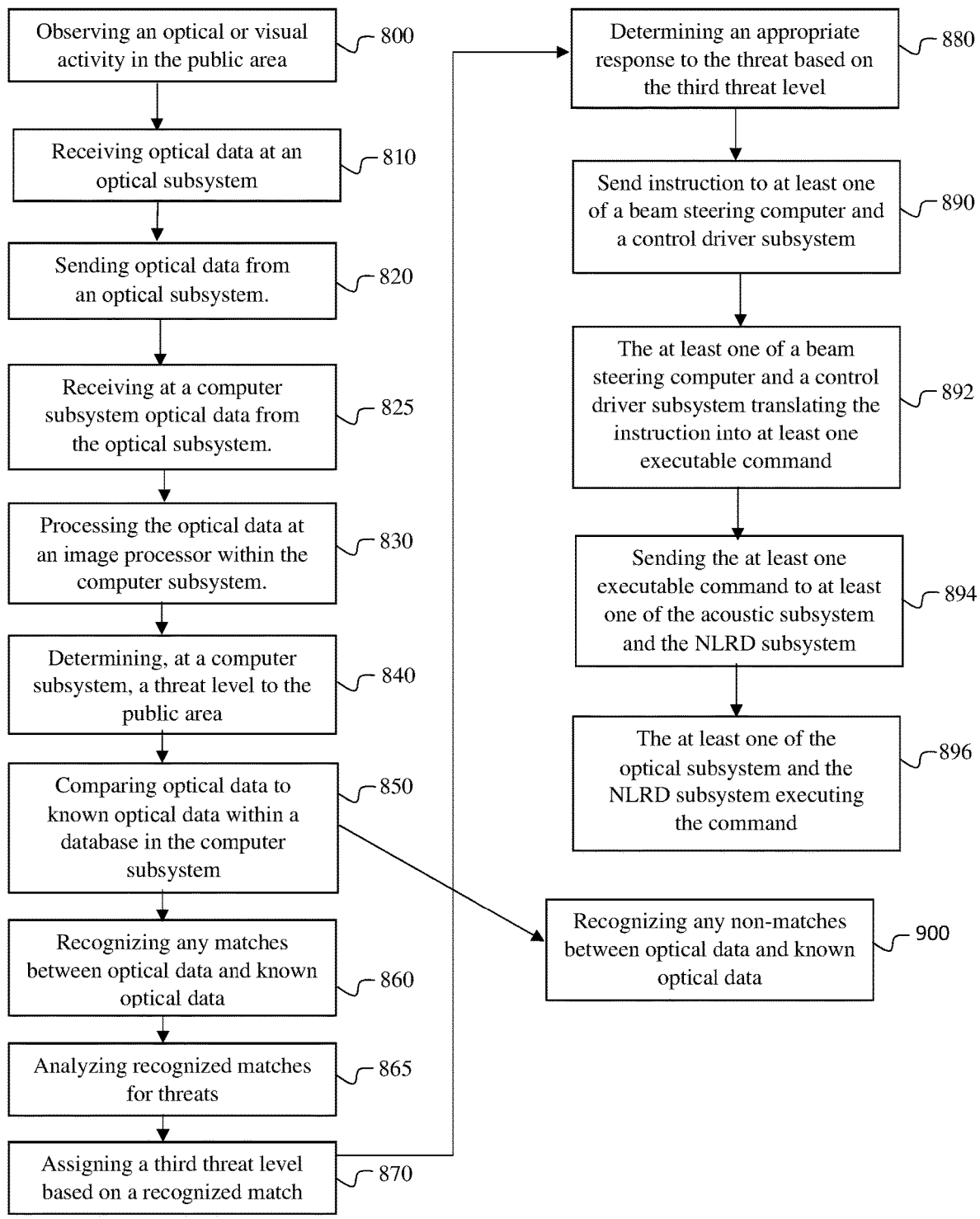
FIG. 7 illustrates a flow chart of certain aspects of the method of using the public area defense system.

The method may further comprise receiving an optical data through an optical subsystem. As illustrated in FIG. 7 by step 810, the method may comprise receiving an optical data from an optical subsystem. The optical data may be received by a computer subsystem. The optical data may comprise any optical data gathered by an optical subsystem. The optical data may comprise still images. The optical data may further comprise video. Further, the optical data may comprise images or video used for facial recognition. The optical data may comprise images or data that may be used for recognition of items such as, for example, weapons. Such weapons may include guns, knives, bows and arrows, grenades, clubs, whips, and other weapons.

The method may further include 820, sending the optical data to a computer subsystem. The optical data may be sent to the computer subsystem via wired transmission from the optical subsystem and acoustic subsystem to the computer subsystem. The method may include sending the optical data to the computer subsystem via wireless transmission or via other methods known in the art.

The method may further comprise 825 receiving at the computer subsystem the optical data.

The method may further include, as indicated by 830 in FIG. 7, processing the optical data at an image processor. Processing the optical data at an image processor may comprise converting the received optical data into a form suitable for analysis, such as into digital form. The information may be zipped or sent in data packets to maximize efficiency and speed of data transfer.

In certain embodiments, as indicated by 840 in FIG. 7, the method may further include determining, at a computer subsystem, a threat level to the public area that is presented by the optical data.

In certain embodiments, determining a threat level to the public area from an optical data may comprise, as represented by 850 in FIG. 7, comparing the optical data to known optical data that is stored in a database within the computer subsystem. Comparing the optical data may comprise comparing received optical data, such as images of faces or images of weapons, to optical data, such as images stored in the database of known individuals. These known individuals may be individuals who are members of a certain group, such as a group that regularly uses the public area. Such a group may include school faculty, school students, members of a club that owns or frequently uses the public area, members of a religious group that owns or frequently uses the public area. The known images may be gathered and stored by recording images in advance. For example, digital pictures of individuals belonging to the groups discussed above or other similar groups, may be voluntarily submitted or taken in advance. Alternatively, images of individuals may be recorded by the computer subsystem, using the optical subsystem as described in other embodiments, to take pictures of individuals, items, settings, encounters and other images. The acoustic subsystem, as described herein, can be used to obtain an audio recording of an individual's voice from which biometrics may be computed. This audio recording and corresponding biometrics may be stored in the computer subsystem's database and the computer subsystem may associate that audio recording and corresponding biometrics with the individual's stored picture and facial biometrics. The face and voice print and corresponding biometrics may then be stored in the database within the computer subsystem to recognize if a speaker is a regular attendee to the public area.

Further, the optical subsystem may gather optical biometric data related to each individual having an image stored in the database. The optical image may include video of an individual or a group of individuals. For example, behavior patterns and normal social interactions may be gathered by the optical subsystem and recorded in the database. This information may then be used as a baseline in determining any deviations from normal behavior when the computer subsystem is making a threat assessment in step 850 of FIG. 7.

In further embodiments, the database may comprise optical data of known threats. For example, the database may contain images and facial biometrics of felons or sex offenders known in the area gathered from law enforcement. Further, the database may store individuals' pictures, biometrics, video of behavior, pictures and videos of groups of people, pictures of weapons and common objects and other images and videos found in the public area, gathered by the optical subsystem.

Additionally, the computer subsystem may continue to add data and information, such as pictures and patterns in optical data, such as an individuals' actions, interactions, objects being carried into the public area, changes in behavior or demeanor, and other observable images, video, and behavior, to its database to constantly improve and broaden its voice recognition and biometric pattern recognition in determining threats and making threat assessments.

Comparing optical data to known optical data as shown in 850 may comprise the computer subsystem comparing images to known images and comparing patterns in optical data, such as an individual's behavior and interactions.

In certain embodiments, the method may further comprise 860, recognizing any matches between the optical data received from the optical subsystem and optical data stored in the database. Recognizing any matches may comprise recognizing a degree of similarity, such as for example, a 50% match, 60% match, a 70% match, an 80% match, a 90% match or a 100% match, or any percentage between these examples.

In certain embodiments, the method may further comprise step 870, assigning a third threat level based on the recognized match from step 860. Assigning the third threat level may comprise assigning a threat level based on the percentage match between observed or received optical data and optical data in the database. Assigning the third threat level may further comprise assigning a threat level based on who the threat is coming from. For example, if the actor, or the speaker who is the source of the acoustic data, is a known bad actor, then the computer subsystem may use this as a factor in assigning a threat level. In some instances, this could result in a higher threat level. Assigning the third threat level may further comprise considering prior history of assaults, weapon possessions, threats, drug use, family instability, etc. All these factors may contribute to a higher threat level being assigned and a lower tolerance of observed threats before acoustic and reactive deterrence subsystem action may be taken.

Further, the method may comprise 880, determining an appropriate response to the threat, based on the third threat level as determined and assigned in 870. The appropriate response will depend on the threat level, including who the actor is and if the actor has a violent past or a propensity for violence or violent reactions. The appropriate response may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise using a system such as a non-lethal reactive deterrence subsystem as previously described herein, to direct a beam of energy at an actor's body or face to stop the threatening behavior.

The method may further comprise 890, upon determining the appropriate response, sending instruction to at least one of a beam-steering computer and to control drivers containing information regarding executing the appropriate response.

The method may further comprise 892, wherein at least one of the control drivers and the beam-steering computer translate the instruction to at least one executable command. The method may further comprise sending the at least one executable command to at least one of the acoustic subsystem and the non-lethal reactive deterrence subsystem (NLRD) to execute the appropriate response. As described herein related to other embodiments, the control drivers control beamwidths, beam shapes, intensity or power output and duration of transmitted beams as well as the sources, beam-steerers, and beam formers of the NLRD, optical, and acoustic subsystems. The beam-steering computer provides instruction and direction to the beam-steering metamaterials.

The method may further comprise 894, the at least one of the acoustic subsystem and the NLRD subsystem executing the command according to the command received. This execution may comprise executing the appropriate response, which may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise sending using a system such as a non-lethal reactive deterrence subsystem as previously described herein, to direct a beam of energy at an actor's body or face to stop the threatening behavior.

Figure 8:
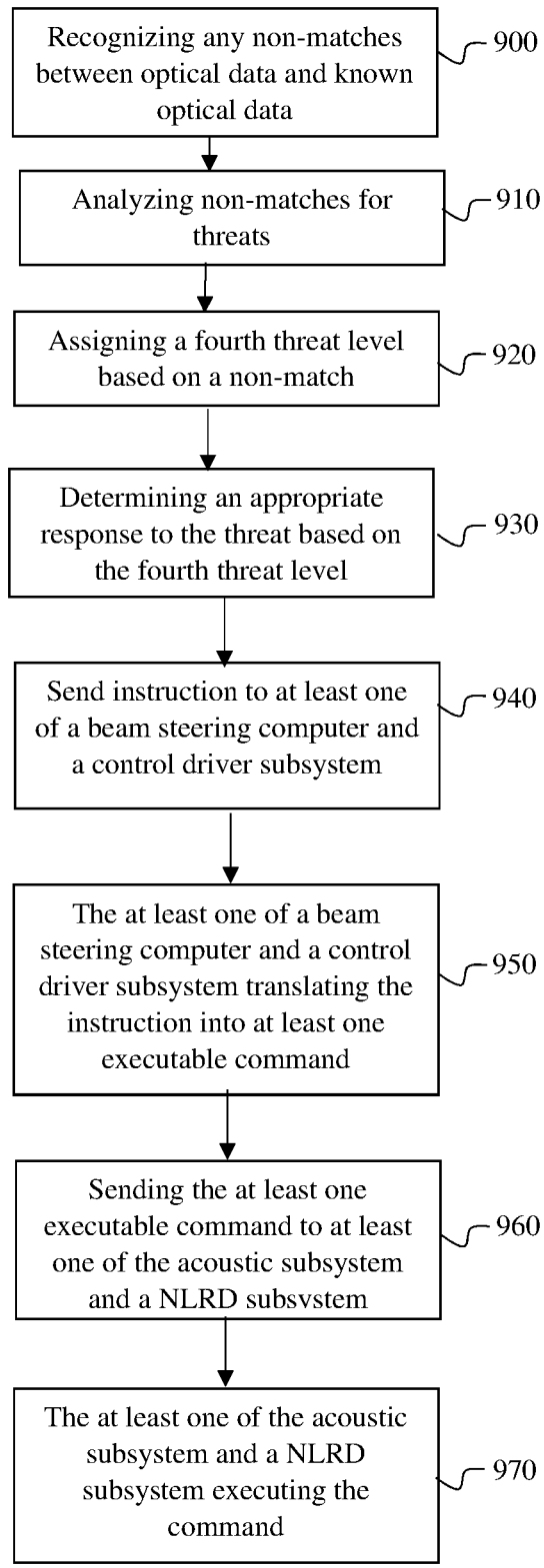
FIG. 8 illustrates a flow chart of certain aspects of the method of using the public area defense system.

In further embodiments, the method of determining a threat level to the public area from an optical data may comprise further determining a second threat level based on at least one of optical data. As illustrated in FIG. 8, the method may comprise receiving optical data as described in relation to FIG. 7. The method may further comprise, after comparing the received optical data to known optical data, recognizing non-matching optical data, as in step 900. Or, in other words, as described herein, comparing received optical data to optical data found in the database and recognizing any received optical data that does not match stored optical data. Non-matching data may include pictures of individuals that do match any images stored in the database, images of potential weapons that do not match images stored in the database, behavior not recognized in the database, and other non-recognized data.

In certain embodiments, the method may further comprise step 900, recognizing any non-matches between voice prints and patterns in acoustic data, such as an individual's speech, words used, volume, and intonation with information stored in the database. Recognizing any non-matches may comprise recognizing a degree of dissimilarity, such as for example, a match between certain particular received optical data and stored optical data, such as facial identifications, behavior patterns, gestures, interactions between people and so forth. The degree of dissimilarity may be best expressed as a percentage similarity, such as for example a similarity between received acoustic data and stored acoustic data less than a 70% match, less than a 60% match, less than a 50% match, less than a 40% match, less than a 30% match, less than a 20% match, less than a 10% match or any percentage between these exemplary examples.

Upon recognizing non-matching data, the computer subsystem may analyze the non-matching data. Analyzing the non-matching optical data may comprise analyzing the received optical data for potential threats and comparing that optical data to known data in a database and cross-referencing the optical data and any matching data with potentially corresponding acoustic data.

In certain embodiments, the method may further comprise step 920, assigning a fourth threat level based on the analysis of the non-matching data in 910. Assigning the fourth threat level may comprise assigning a threat level based on the determination of a likely threat from an unknown object, interaction, or person, or drawing a conclusion based on a combination of these factors. Assigning the fourth threat level may further comprise assigning a threat level based on from whom the threat is coming. For example, if the actor, or the source of the optical data, is a known or a discovered bad actor, then the computer subsystem may use this as a factor in assigning a threat level. In some instances, this could result in a higher threat level. Assigning the fourth threat level may further comprise factoring in analysis from the acoustic subsystem and related analysis and/or the reaction to any action taken by an actor in response to activity from the reactive deterrence subsystem.

Further, the method may comprise 930, determining an appropriate response to the threat, based on the fourth threat level as determined and assigned in 920. The appropriate response will depend on the threat level, possibly including who the actor is and if the actor has a violent past or a propensity for violence or violent reactions. The appropriate response may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise using a system such as a non-lethal reactive deterrence subsystem as previously described herein, to direct a beam of energy at an actor's body or face to stop the threatening behavior.

The method may further comprise 940 upon determining the appropriate response, sending instruction to at least one of a beam-steering computer and to control drivers containing information regarding executing the appropriate response.

The method may further comprise 950, wherein at least one of the control drivers and the beam-steering computer translate the instruction to at least one executable command. The method may further comprise sending the at least one executable command to at least one of the acoustic subsystem and the non-lethal reactive deterrence subsystem (NLRD) to execute the appropriate response. As described herein related to other embodiments, the control drivers control beamwidths, beam shapes, intensity or power output and duration of transmitted beams as wells as the sources, beam-steerers, and beam formers of the NLRD, optical, and acoustic subsystems. The beam-steering computer provides instruction and direction to the beam-steering meta materials.

The method may further comprise 960, the at least one of the acoustic subsystem and the NLRD executing the command according to the command received. This execution may comprise executing the appropriate response, which may comprise an audio warning via an alarm sound or specific audio instruction, such as, for example, instruction to cease and desist from the threatening behavior, instruction to move to another area, or instruction to go to a designated safe zone. In further embodiments, the appropriate response may comprise sending using a system such as a non-lethal reactive deterrence subsystem as previously described herein, to direct a beam of energy at an actor's body or face to stop the threatening behavior.

It should be noted that the embodiments described herein above can be performed simultaneously or concurrently. The system may analyze both acoustic data and optical data and may use both sets of data to determine the threat level and the appropriate response.

Figure 9:
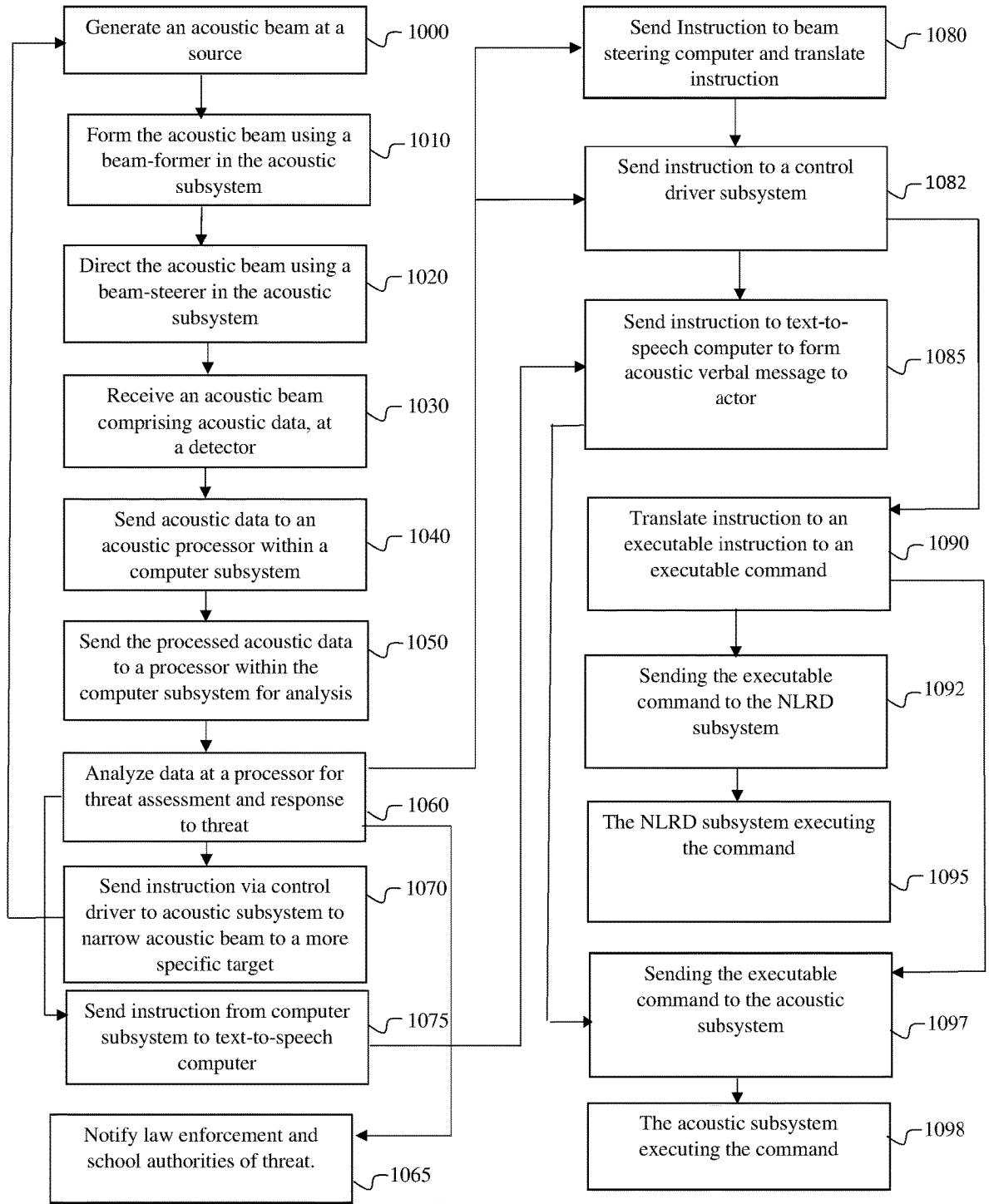
FIG. 9 illustrates a flow chart of certain aspects of the method of using the public area defense system.

In some embodiments, the method may further comprise the method as illustrated in FIG. 9. FIG. 9 provides an illustration of the of the method of receiving acoustic data and sending acoustic data. In some embodiments, receiving the acoustic data may comprise 1000 generating at a source an acoustic beam. The acoustic beam may be generated as described in previous embodiments. As previously discussed, an acoustic beam source may comprise metamaterials.

As shown in 1010, the method may further comprise, after generating a beam, forming a beam at a beam-former. The acoustic beam may be formed as described in previous embodiments. As previously discussed, an acoustic beam-former may comprise metamaterials.

As shown in 1020, the method may further comprise directing a beam using a beam-steerer. As previously discussed, an acoustic beam-steerer may comprise metamaterials.

After the acoustic beam is sent out, the acoustic beam may detect noise within the public area. The noise may be made by an actor, either vocally by the actor, by the use of an object that the actor may hold, or by movement from the actor's body. The acoustic energy produced by the noise may travel back to the acoustic subsystem. The method may further comprise 1030 receiving an acoustic beam containing acoustic data at a detector. As previously discussed, the detector may be physically part of the same metamaterial layer as the beam source and may also comprise metamaterials As shown in 1040, after receiving the beam containing acoustic data, the method may further comprise sending the data to a computer subsystem comprising an acoustic processor. The acoustic processor may process the acoustic data to put the data into a form suitable for analysis.

As shown in 1050, after the data has been processed by the acoustic processor, the processed data may then be sent to a processor within the computer subsystem for analysis.

As shown in 1060, after the data has been sent for analysis, the computer subsystem may analyze the data in order to evaluate the threat presented by the acoustic data (threat assessment) and to formulate a response to the threat. The threat may be analyzed and a response formed as previously described herein.

In some embodiments, the method may include 1065 the computer subsystem sending a notification to law enforcement of the threat or the potential threat. The notification may be via instant message, text message, phone call, or other suitable notification.

Further, if the analysis indicates that further information is needed, the method may comprise 1070, sending an instruction to the acoustic subsystem via the control driver subsystem to narrow the outgoing acoustic beam to a more specific target.

Further, the method may comprise 1075, sending an instruction from the computer subsystem to the text to speech computer. The method may comprise 1080, concurrently sending and instruction to the beam-steering computer. The method may further comprise 1082 sending the instruction to the control drivers. The method may further comprise the beam-steering computer translating its instruction and sending its instruction to the control drivers.

The method may further comprise 1090 the control drivers translating the instruction received into executable commands. The executable commands may comprise commands to the acoustic subsystem or to the non-lethal reactive deterrence subsystem, similar to other embodiments as previously described herein.

The method may further comprise 1092 sending the executable instruction to the acoustic subsystem and directing the acoustic subsystem to execute the executable instruction. The executable command may comprise commands as previously discussed herein, including instruction to form and direct audible and acoustic instruction to the an actor to cease and desist his actions and or to move to another location, or cause pain in or to the ears to compel the actor to stop.

The method may further comprise 1095 sending the executable instruction to the NLRD subsystem and directing the NLRD subsystem to execute the executable instruction. The executable command may comprise commands as previously discussed herein, including instruction to form and direct a beam of energy to the body or face of an actor.

The method may further comprise 1097, wherein the acoustic subsystem executes the executable command, similar to embodiments previously described herein.

The method may further comprise 1098, wherein the NLRD subsystem executes the executable command, similar to embodiments previously described herein.

The method may further comprise repeating the method steps to reevaluate the threat.

The method may further comprise the acoustic subsystem comprising a detector operable to detect an incoming acoustic beam, a source next to the detector, the source operable to generate an acoustic beam, a beam-former operably coupled to the detector and source, wherein the beam-former is a metamaterial layer; and a beam-steerer operably coupled to the beam-former, wherein the beam-steerer is a metamaterial layer and is operable to direct at least one acoustic signal to the actor. The method may further comprise wherein an initial acoustic beam is broad, and further wherein a subsequent acoustic beam is narrowed, narrowing onto a location of a potential threat. The method may further comprise time-sharing the narrow received acoustic beam among multiple actors.

The method may further comprise wherein the instruction comprises an instruction to the acoustic subsystem to direct a focused narrow acoustic beam at the actor.

The method may further comprise the audio signal being operable to perform one of deterring aggressive behavior, instructing the actor to lay down all weapons, and instructing the actor(s) to move to a safe zone.

Figure 10:
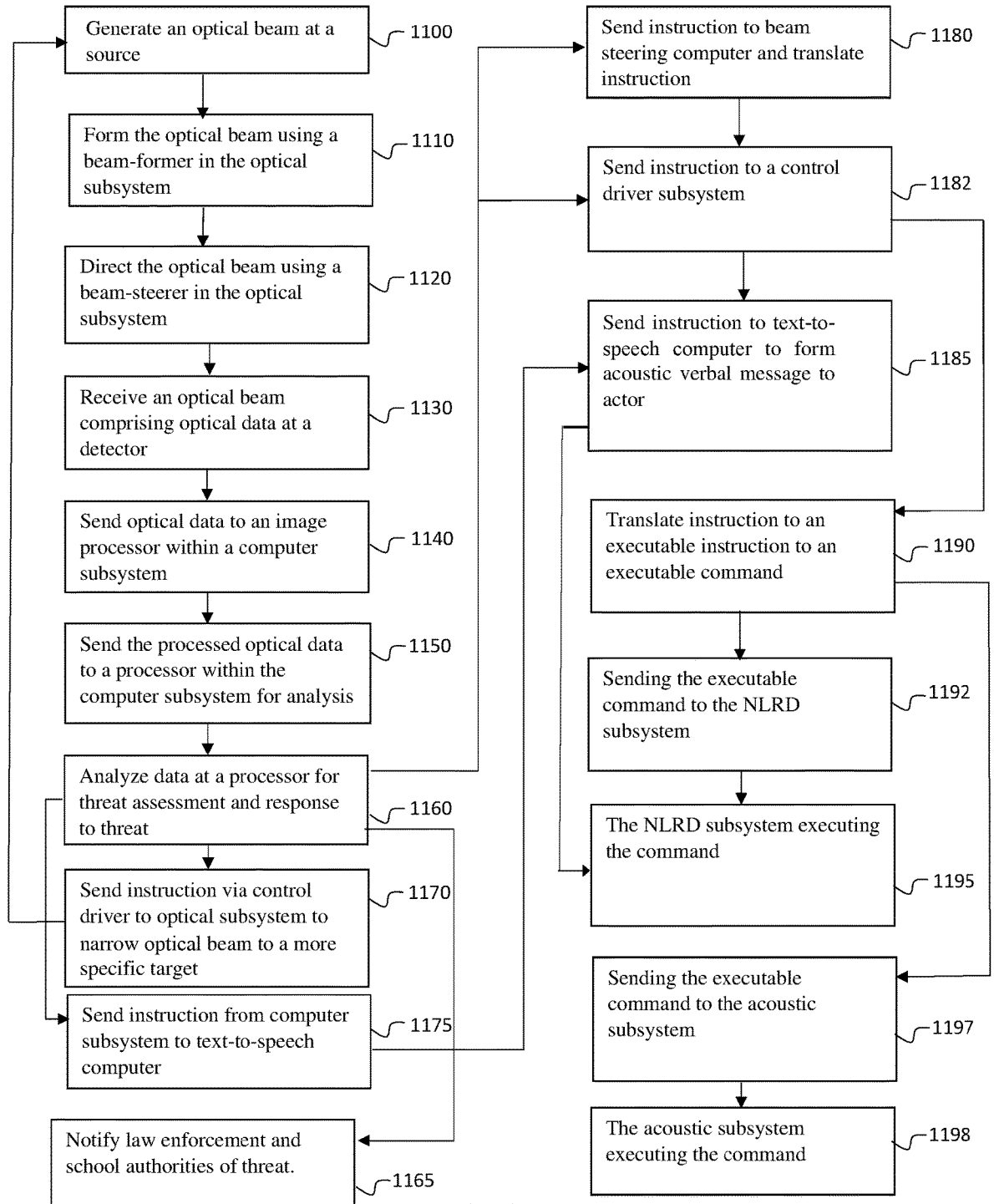
FIG. 10 illustrates a flow chart of certain aspects of the method of using the public area defense system.

In some embodiments, the method may further comprise the method as illustrated in FIG. 10. FIG. 10 provides an illustration of the of the method of receiving optical data and sending optical data. In some embodiments, receiving the optical data may comprise 1100 generating at a source an optical beam. The optical beam may be generated as described in previous embodiments. As previously discussed, an optical beam source may comprise metamaterials.

As shown in 1110, the method may further comprise, after generating a beam, forming a beam at a beam-former. The optical beam may be formed as described in previous embodiments. As previously discussed, an optical beam-former may comprise metamaterials.

As shown in 1120, the method may further comprise directing the system using a beam-steerer. As previously discussed, an optical beam-steerer may comprise metamaterials used in connection with a Light Detection and Ranging (LiDAR) system to send out a beam and receive reflections of light from observed objects.

After the initial beam is sent out, as shown in 1130, the method may further comprise receiving an optical beam containing optical data at a source. The optical data may comprise reflected light coming into the LiDAR system. As previously discussed, the optical data may be gathered by elements that may also comprise metamaterials. In some embodiments, the optical data may be passively gathered by an optical subsystem only using metamaterials for the beam-former, beam-steerer, and source.

As shown in 1140, after receiving the beam containing optical data, the method may further comprise sending the data to a computer subsystem comprising an image processor. The image processor may process the optical data, such as image and video to put the data into a form suitable for analysis.

As shown in 1150, after the data has been processed by the image processor, the processed data may then be sent to a processor within the computer subsystem for analysis. As discussed herein related to previous embodiments, the analysis may comprise determining, by an artificial intelligence program, a threat level presented by the collected optical data, and a determination of an appropriate response.

As shown in 1160, after the data has been sent for analysis, the computer subsystem may analyze the data in order to evaluate the threat presented by the optical data (threat assessment) and to formulate a response to the threat. The threat may be analyzed, and a response formed as previously described herein.

In some embodiments, the method may include 1165 the computer subsystem sending a notification to law enforcement of the threat or the potential threat. The notification may be via instant message, text message, phone call, or other suitable notification.

Further, if the analysis indicates that further information is needed, the method may comprise 1170, sending an instruction to the optical subsystem via the control driver subsystem to gather additional information by focusing on a specific target.

Further, the method may comprise 1175, sending an instruction from the computer subsystem to the text to speech computer. The method may comprise 1180, concurrently sending and instruction to the beam-steering computer. The method may further comprise 1182 sending the instruction to the control drivers. The method may further comprise the beam-steering computer translating its instruction and sending its instruction to the control drivers.

The method may further comprise 1190 the control drivers translating the instruction received into executable commands. The executable commands may comprise commands to the acoustic subsystem or to the non-lethal reactive deterrence subsystem, similar to other embodiments as previously described herein.

The method may further comprise 1192 sending the executable instruction to and directing the optical subsystem to execute the executable instruction. The executable command may comprise commands as previously discussed herein, including instruction to form and direct audible and acoustic instruction to the an actor to cease and desist his actions and or to move to another location, or cause pain in or to the ears to compel the actor to stop.

The method may further comprise 1195 sending the executable instruction to and directing the NLRD subsystem to execute the executable instruction. The executable command may comprise commands as previously discussed herein, including instruction to form and direct a beam of energy to the body or face of an actor.

The method may further comprise 1197, wherein the acoustic subsystem executes the executable command, similar to embodiments previously described herein.

The method may further comprise 1198, wherein the NLRD subsystem executes the executable command, similar to embodiments previously described herein.

The method may further comprise repeating the method steps to reevaluate the threat.

The method may further comprise an instruction to the optical subsystem to direct a focused narrow optical beam at the actor.

The method may further comprise the audio signal being operable to perform one of deterring aggressive behavior, instructing the actor to lay down all weapons, and instructing the actor(s) to move to a safe zone.

The method may further comprise receiving the optical data from the optical subsystem, the optical subsystem comprising a source operable to generate an optical beam, a beam-former operably coupled to the detector and source, wherein the beam-former is a metamaterial layer; and a beam-steerer operably coupled to the beam-former, wherein the beam-steerer is a metamaterial layer and is operable to direct at least one acoustic signal to the actor.

The method may further comprise determining a threat level to the public area by the optical data further comprising the computer assigning a threat level by at least one of: analyzing optical data of the actor collected from the optical subsystem; analyzing optical data of objects collected from the optical subsystem; analyzing visual interactions between multiple actors; and identifying the actor by comparing an image of the actor's face to identified images stored in the database.

The method may further comprise wherein the NLRD subsystem comprises:
a source operable to operate at 95 Gigahertz (GHz) and form a beam of energy at 95 GHz;
a beam-former operably coupled to the source, wherein the beam-former is a metamaterial layer;
and a beam-steerer operably coupled to the beam-former, wherein the beam-steerer is a metamaterial layer and wherein the beam-steerer is operable to direct the beam of energy to the actor.

The method may further comprise, wherein the instruction comprises an instruction to the NLRD subsystem to direct a beam of energy at the actor.

Figure 11:
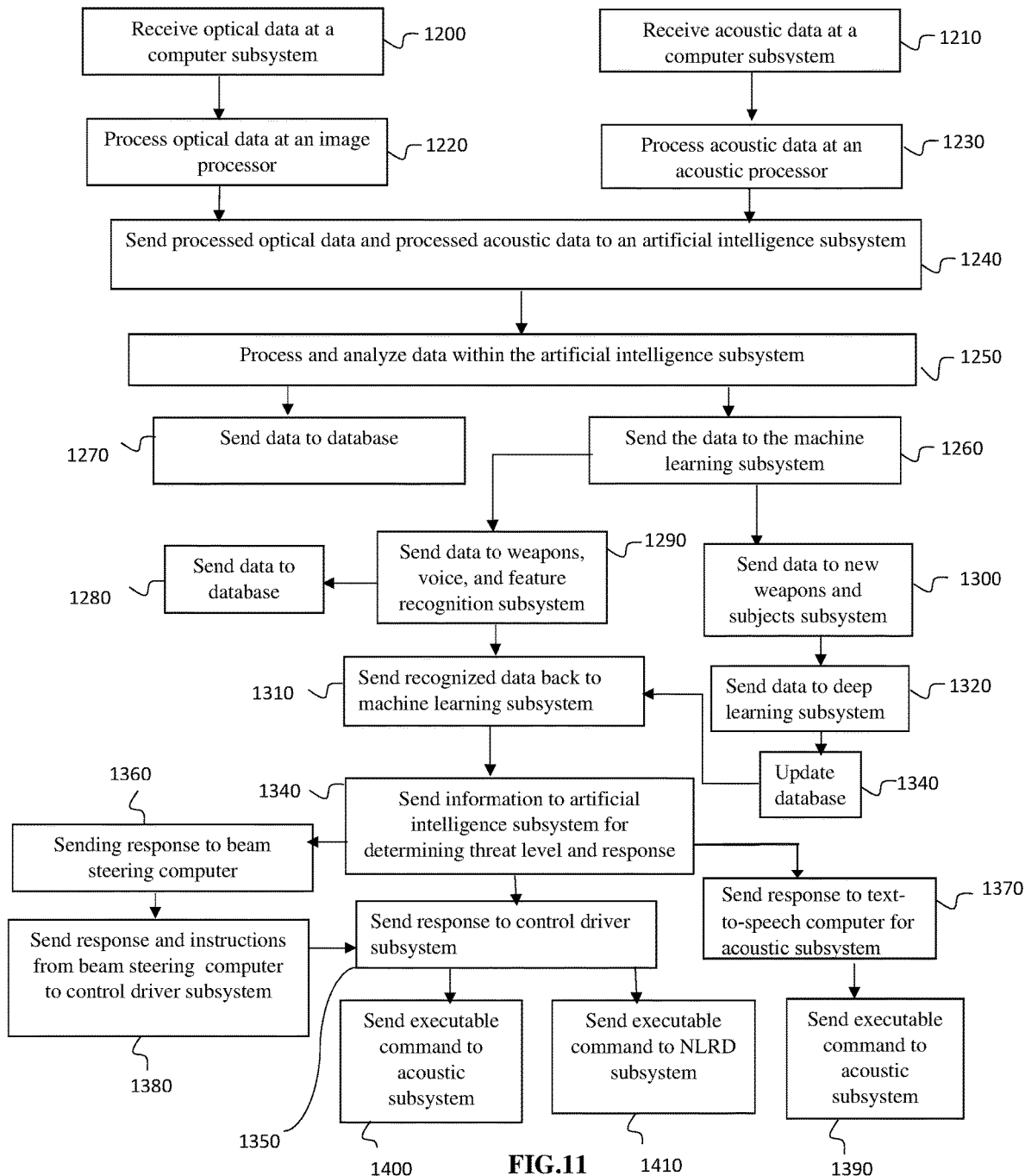
FIG. 11 illustrates a flow chart of certain aspects of the method of using the public area defense system.

FIG. 11 illustrates a receiving data and making a threat assessment according to a particular embodiment. The method may comprise 1200 receiving optical data at a computer subsystem. This may be done in a manner similar to those methods previously discussed herein.

The method may further comprise 1210 receiving acoustic data at a computer subsystem. This may be done in a manner similar to those methods previously discussed herein.

The method may further comprise 1220 processing images and video at an image processor within the computer subsystem. This may be done in a manner similar to those methods previously discussed herein.

The method may further comprise 1230 processing acoustic data at an acoustic processor. This may be done in a manner similar to those methods previously discussed herein.

The method may further comprise 1240 sending the optical data and/or the acoustic data to an artificial intelligence subsystem to analyze the optical data and/or the acoustic data. The analysis 1250 may be performed according to methods previously described herein.

The method may further comprise 1260 sending the optical data and/or the acoustic data to the machine learning subsystem. The machine learning subsystem may add data to its database and, based on the data and behavior patterns, may learn and improve and make new determinations regarding what comprises a threat.

The method may further comprise 1270 sending the optical data and/or the acoustic data to a database within the computer subsystem.

The method may further comprise the machine learning subsystem sending the optical data and/or the acoustic data to the database. The machine learning subsystem may send the optical and/or acoustic data to the database in order to recognize matches and non-matches between the optical data and/or acoustic data and stored respective optical data and/or acoustic data. Upon finding matching data, the database may send information regarding matching data and non-matching data back to the machine learning subsystem.

The method may further comprise sending the optical data and/or acoustic data to a recognition subsystem that is operable to recognize weapons, voices, facial, and other body features, such as ears, eyes, lips, tattoos, scars, moles, and other distinctive features. The recognition subsystem may further be operable to assign a percentage match or a likely match to various objects or features that may not have a 100 percent match.

The method may further comprise 1310 upon recognizing a match, the recognition subsystem may send back to the machine learning subsystem the recognized data. Further, upon recognizing a non-match or a partial match, the recognition subsystem may pass this information to the machine learning subsystem.

The method may further comprise 1300 the machine learning subsystem sending the optical data and/or acoustic data to a new weapons and subjects subsystem. This may include non-matches and partial matches. The new weapons and subjects subsystem may be operable to identify new weapons and new people that may not be in the database, and subsequently update the database with new information via the deep learning subsystem.

The method may further comprise 1320 sending the information from the new weapons and subjects subsystem to the deep learning subsystem. The deep learning subsystem may be operable to analyze objects and determine if they may be used as a weapon and may be operable to find new individuals, weapons, or behavior patterns of actors being observed. In some embodiments the deep learning subsystem may be connected to an external network to further access information about potential weapons and people.

The method may further comprise the 1340 deep learning subsystem sending to the database the information regarding the new weapons and subjects it may have determined to be threatening weapons and actors such that the database is updated. The database may then send the updated information back to the machine learning subsystem to be used in its analysis.

The method may further comprise 1330 sending the updated data and information from the machine learning subsystem to the artificial intelligence subsystem. The artificial intelligence system may then determine a threat level based on the information provided from the machine learning subsystem and may determine an appropriate response level and prepare instructions for executing that response.

The method may further comprise 1350 sending the appropriate response from the artificial intelligence subsystem to the beam-steering computer. The method may further comprise 1360 sending the appropriate response from the artificial intelligence system to the control driver subsystem and converting the appropriate response into an executable command. The method may further comprise 1380 sending the appropriate response and associated instructions from the beam-steering computer to the control driver subsystem. The method may further comprise 1370 sending appropriate response from the artificial intelligence subsystem to the text-to-speech computer and the text-to-speech computer converting the instruction regarding the appropriate response to an executable command.

The method may further comprise 1390 sending the executable command from the text-to-speech computer to the acoustic subsystem and the acoustic subsystem executing the command. The appropriate response may be similar to those mentioned with respect to previous embodiments as discussed herein.

The method may further comprise 1400 sending the executable command from the control driver subsystem to the acoustic subsystem and the acoustic subsystem executing the command. The appropriate response may be similar to those mentioned with respect to previous embodiments as discussed herein.

The method may further comprise 1400 sending the executable command from the control driver subsystem to the NLRD subsystem and the NLRD subsystem executing the command. The appropriate response may be similar to those mentioned with respect to previous embodiments as discussed herein.

In certain aspects, the invention may include the following embodiments:

A first embodiment may include a public area defense system that may comprise a non-lethal Reactive deterrence subsystem. The first embodiment may further include an optical subsystem operably coupled to the non-lethal Reactive deterrence defense subsystem. The first embodiment may further include an acoustic subsystem operably coupled to the non-lethal reactive deterrence defense subsystem. The first embodiment may further include a computer system in communication with each of the non-lethal reactive deterrence defense subsystem, the optical LiDAR subsystem, and the acoustic subsystem. Each of the non-lethal reactive deterrence defense subsystem, the optical LiDAR subsystem, and the acoustic subsystem is operable to interact with an actor.

A second embodiment may include system of embodiment 1 and may further comprise an image processor in communication with the optical subsystem. A control driver subsystem may be in communication with each of the non-lethal reactive deterrence defense subsystem, the optical LiDAR subsystem, and the acoustic subsystem. A beam-steering computer may be in communication with the control driver subsystem and a text-to-speech computer may be in communication with the acoustic subsystem. Further, an acoustic processor may be in communication with the acoustic subsystem.

A third embodiment may include system of embodiment 2 wherein the computer system further comprises an artificial intelligence subsystem in communication with each of the image processor, the control driver subsystem, the text-to-speech computer, and the acoustic processor.

A fourth embodiment may include the system of embodiment 3 wherein the computer system further comprises a machine learning subsystem in communication with the artificial intelligence subsystem. The computer system may further comprise a database in communication with the artificial intelligence subsystem and in communication with the machine learning subsystem. The computer system may further comprise a recognition subsystem in communication with the machine learning subsystem. The computer system may further comprise a new weapons and subjects subsystem in communication with the machine learning subsystem. The computer system may further comprise a deep learning subsystem in communication with the new weapons and subjects subsystem and in communication with the database.

A fifth embodiment may comprise the system of embodiment 1, wherein the optical subsystem comprises a detector and a beam-steerer operably coupled to the detector, wherein the beam-steerer is a metamaterial layer, and a beam-former operably coupled to the detector and operably coupled to the beam-steerer.

A sixth embodiment may comprise the embodiment of embodiment 1, wherein the optical subsystem further comprises a Light Detection and Ranging (LiDAR) system integrated with the beam-former, the LiDAR system operable to send a beam generated by the optical subsystem and to receive a reflected beam. Alternatively, the sixth embodiment may comprise the embodiment of claim 5.

A seventh embodiment may comprise the system of embodiment 1, wherein the NLRD subsystem comprises a source operable to operate at 95 Gigahertz (GHz) and form a beam of energy at 95 GHz. The NLRD subsystem may further comprise a beam-former operably coupled to the source, wherein the beam-former is a metamaterial layer. The NLRD subsystem may further comprise a beam-steerer operably coupled to the beam-former, wherein the beam-steerer is a metamaterial layer and wherein the beam-steerer is operable to direct the beam of energy to the actor.

An eighth embodiment may comprise the system of embodiment 1, wherein the acoustic subsystem comprises: a detector and source, a beam-former operably coupled to the detector and source, wherein the beam-former is a metamaterial layer, and a beam-steerer operably coupled to the beam-former, wherein the beam-steerer is a metamaterial layer and is operable to direct at least one acoustic signal to the actor.

A ninth embodiment may comprise a method of deterring an actor in a public area. The method may comprise gathering one of an optical data through an optical subsystem and an acoustic data through an acoustic subsystem, sending the one of an optical data and an acoustic data to a computer system, processing the one of an optical data and an acoustic data, determining if the one of an optical data and an acoustic data indicate a danger to the public area, and instructing, through a control subsystem in communication with the computer system, a non-lethal reactive deterrence defense system to direct a beam of energy to the actor's face or body.

A tenth embodiment may comprise the method of embodiment 9 may further comprise instructing, through the control subsystem in communication with the computer system, the acoustic subsystem to send an audio signal to the actor to deter aggressive behavior, to lay down any and all weapons, and, in some cases, to instruct the actor(s) to move to a safe zone, which may include a specialized, self-locking containment device that can be opened only by authorized law enforcement or security personnel.

An eleventh embodiment may comprise the method of embodiment 9, wherein the NLRD subsystem comprises a source, a beam-former, and a beam-steerer, wherein each of the source, the beam-former, and the beam-steerer is a metamaterial layer.

A twelfth embodiment may comprise the method of embodiment 11, wherein the source comprises a solid-state device such as a resonator operating at 95 Gigahertz (GHz) with a power amplifier.

A thirteenth embodiment may comprise the method of embodiment 12, wherein the power amplifier further comprises gallium nitride composite devices combined with aluminum, indium or other series III and V elements to produce higher power output from solid state devices.

A fourteenth embodiment may comprise the method of embodiment 12, further comprising the power source generating the beam of energy at 95 GHz, and further comprising a metamaterial output network that produces added power efficiency through trapping unwanted harmonics and phase-shifting out-of-phase amplifiers to be in-phase.

A fifthteenth embodiment may comprise any of the embodiments, 1 through 14, but further comprising a computer subsystem on a single silicon wafer in which all of the dielet and chiplet processors and other devices are mounted, interconnected, and interfaced to all input/output devices through silicon interconnect fabric which is comprised of thermal connections without solder and finer traces routed in multiple layers of the silicon wafer such that an entire computer with all processors and storage are integrated as a System-on-a-silicon-Interconnect-Fabric (SoIF) to operate at faster speeds, smaller size and weight, less power and much lower overall cost than traditional System-on-a-Chip mounted and interconnected on Printed Circuit Boards.

A sixthteenth embodiment may comprise the method of embodiment 15 wherein each of the subsystems within the computer subsystem may be operably connected to an external network in order to obtain information therefrom A seventeenth embodiment may comprise method of deterring an actor in a public area, the method comprising: receiving at least one of an optical data through an optical subsystem and an acoustic data through an acoustic subsystem; sending the at least one of an optical data and an acoustic data to a computer system; receiving, at a computer system, the at least one of an optical data and an acoustic data; processing the at least one of an optical data and an acoustic data; determining, at a computer, a threat level to the public area by the at least one of an optical data and an acoustic data to the public area, wherein the determining comprises: comparing the at least one of an optical data and an acoustic data to known optical data and known acoustic data stored in a database accessible by the computer system; recognizing any matches between the at least one of an optical data and an acoustic data and the known optical data and the known acoustic data stored in the database accessible by the computer system; assigning a first threat level to the matches of the at least one of an optical data and an acoustic data based on the recognized matches; determining an appropriate response based on at least one of the first threat level or the second threat level; and upon determining the appropriate response, sending an instruction, by the computer system, the instruction containing the appropriate response, to at least one of the acoustic subsystem and a non-lethal reactive deterrence subsystem to carry out the instruction An eighteenth embodiment may comprise the method of embodiment 17, wherein sending the instruction further comprises: sending the instruction, by the computer system, the instruction containing the appropriate response, to at least one of a control subsystem and a beam-steering computer, wherein each of the control subsystem and the beam-steering computer is in communication with the computer system; translating the instruction, by the at least one of a control system and a beam-steering computer, to an executable command; and sending the executable command, by the at least one of a control subsystem and a beam-steering computer, to at least one of the acoustic subsystem and a non-lethal reactive deterrence defense system, wherein at least one of the acoustic subsystem and the non-lethal reactive deterrence defense system executes the command A nineteenth embodiment may comprise the method of embodiment 18, wherein the determining further comprises: recognizing non-matches between the at least one of an optical data and an acoustic data and the known optical data and the known acoustic data stored in the database accessible by the computer system; for any non-matches, further comparing non-matches to known optical data and acoustic data and determining a level of similarity between the non-matches and the known optical data and the known acoustic data; assigning a second threat level to the non-matches of the at least one of an optical data and an acoustic data; determining an appropriate response based on at least one of the first threat level or the second threat level; sending an instruction, by the computer system, the instruction containing the appropriate response, to a control subsystem in communication with the computer system; translating the instruction, by the control system, to an executable command; and sending the executable command, by the control subsystem to at least one of the acoustic subsystem and a non-lethal reactive deterrence defense system, wherein at least one of the acoustic subsystem and the non-lethal reactive deterrence defense system executes the command A twentieth embodiment may comprise the method of embodiment 19, wherein receiving the acoustic data comprises: receiving the acoustic data from the acoustic subsystem, the acoustic subsystem comprising: a detector operable to detect an incoming acoustic beam; a source next to the detector, the source operable to generate an acoustic beam; a beam-former operably coupled to the detector and source, wherein the beam-former is a metamaterial layer; and a beam-steerer operably coupled to the beam-former, wherein the beam-steerer is a metamaterial layer and is operable to direct at least one acoustic signal to the actor; wherein an initial received acoustic beam is broad, and further wherein a subsequent received acoustic beam is narrowed, narrowing onto a location of a potential threat A twenty-first embodiment may comprise the method of embodiment 18, wherein determining a threat level to the public area by the acoustic data further comprises the computer assigning a threat level by at least one of: analyzing spoken words; analyzing the volume of the spoken words and changes in volume of the spoken words; analyzing changes in the intonation of the spoken words and changes in the intonation of the spoken words; and identifying the actor by comparing an acoustic data containing the actor's voice to voice prints stored in the database.

A twenty-second embodiment may comprise the method of embodiment 21, wherein the instruction comprises an instruction to the acoustic subsystem to direct a focused narrow acoustic beam at the actor A twenty-third embodiment may comprise the method of embodiment 22, wherein the audio signal is operable to perform one of deterring aggressive behavior, instructing the actor to lay down all weapons, and instructing the actor(s) to move to a safe zone.

A twenty-fourth embodiment may comprise the method of embodiment 19, further comprising the computer system notifying law enforcement officials of the threat.

A twenty-fifth embodiment may comprise generating an acoustic beam a source; forming the acoustic beam using a beam-former in the acoustic subsystem; directing the acoustic beam using a beam-steerer in the acoustic subsystem; receiving an acoustic beam comprising acoustic data at a detector; sending acoustic data to an acoustic processor within a computer subsystem; send the processed acoustic data to a processor within the computer subsystem for analysis; analyzing data at a processor for a threat assessment and response to a threat, sending instruction from a computer subsystem to a text-to-speech computer, notifying law enforcement and school authorities of threat, sending instruction via a control driver to an acoustic subsystem to narrow the acoustic beam to a more specific target, sending instruction to a beam-steering computer to translate instruction, and sending instruction to a control driver subsystem; sending from the text-to-speech computer instruction to the acoustic subsystem to form an acoustic verbal message to the actor; translate instructions at a control driver into an executable command; send the executable demand to one of the NLRD subsystem and the acoustic subsystem; or send the executable command to the optical subsystem; any of the subsystems executing the command.

A twenty-sixth embodiment may comprise generating an optical beam a source; forming the optical beam using a beam-former in the acoustic subsystem; directing the optical beam using a beam-steerer in the optical subsystem; receiving an optical beam comprising acoustic data at a detector; sending optical data to an image processor within a computer subsystem; send the processed acoustic data to a processor within the computer subsystem for analysis; analyzing data at a processor for a threat assessment and response to a threat, sending instruction from a computer subsystem to a text-to-speech computer, notifying law enforcement and school authorities of threat, sending instruction via a control driver to an acoustic subsystem to narrow the acoustic beam to a more specific target, sending instruction to a beam-steering computer to translate instruction, and sending instruction to a control driver subsystem; sending from the text-to-speech computer instruction to the acoustic subsystem to form an acoustic verbal message to the actor; translate instructions at a control driver into an executable command; send the executable demand to one of the NLRD subsystem and the acoustic subsystem; or send the executable command to the optical subsystem; any of the subsystems executing the command.

The twenty sixth embodiment may comprise the method of embodiment 25.

A twenty-seventh embodiment may comprise the method of embodiment 26 wherein the optical subsystem utilizes metamaterials.

A twenty-eight embodiment may comprise the method of embodiment 26 or 27, wherein the optical system comprises the use of a Light Detection and Ranging system.

A twenty-ninth embodiment may comprise receiving at least one of an optical data and an acoustic data at a computer system; the optical data and the acoustic data may have been gathered via an optical subsystem and an acoustic subsystem, respectively, wherein the subsystem may receive their respective information using layers of metamaterials, as described herein; the at least one of an optical data and an acoustic data may be processed at respective optical processors and acoustic processors; the method may further comprise sending at least one of processed optical data and processed acoustic data to an artificial intelligence subsystem within a computer system; processing and analyze the at least one processed optical data and processed acoustic data; sending the analyzed data to a database within the computer system, and to a machine learning subsystem; the machine learning subsystem may send information to a weapons voice and feature recognition subsystem and to a new weapons and subjects subsystem; the weapons, voice, and feature recognition subsystem may send updated data to the database and may send information it has learned to the machine learning subsystem; the new weapons and subjects subsystem may send information to a deep learning subsystem; the deep learning subsystem may update the database with new information; the database may send such information to the machine learning subsystem; the machine learning subsystem may send information to the artificial intelligence system; the artificial intelligence system may determine a threat level and appropriate response based on the information received; the response may be sent to a beam-steering computer, to a control driver subsystem and/or to a text-to-speech computer; the beam-steering computer may send instruction to the control driver subsystem; the control driver subsystem may convert the instruction to a set of executable commands; the executable command may be sent at least one of the acoustic subsystem and the non-lethal reactive deterrence subsystem; the least one of the acoustic subsystem and the non-lethal reactive deterrence subsystem may execute the command; the text-to-speech computer may convert its instruction to an executable command for the acoustic subsystem and send that command to the acoustic subsystem; the acoustic subsystem may execute the command.

A thirtieth embodiment may comprise the method of embodiment 29, further comprising the artificial intelligence subsystem sending an instruction for a response directed to the optical subsystem, where the control driver subsystem received the instruction, translates the instruction to an executable command, and sends the executable command to the optical subsystem; wherein the optical subsystem executes the command.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A public area defense system, comprising:
a non-lethal reactive deterrence defense subsystem;
an optical subsystem operably coupled to the non-lethal reactive deterrence defense subsystem;
an acoustic subsystem operably coupled to the non-lethal reactive deterrence defense subsystem, wherein each of the non-lethal reactive deterrence defense subsystem, the optical subsystem, and the acoustic subsystem is operable to interact with an actor;
a computer subsystem in communication with each of the non-lethal reactive deterrence defense subsystem, the optical subsystem, and the acoustic subsystem;
an image processor in communication with the optical subsystem;
a control driver subsystem in communication with each of the non-lethal reactive deterrence defense subsystem, the optical subsystem, and the acoustic subsystem;
a beam-steering computer in communication with the control driver subsystem;
a text-to-speech computer in communication with the acoustic subsystem; and
an acoustic processor in communication with the acoustic subsystem;
wherein the computer system further comprises:
an artificial intelligence subsystem within the computer subsystem, the artificial intelligence subsystem being in communication with each of the image processor, the control driver subsystem, the beam-steering computer, the text-to-speech computer, and the acoustic processor.

2. The system of claim 1, wherein the computer system further comprises:
a machine learning subsystem in communication with the artificial intelligence subsystem;
a database in communication with the artificial intelligence subsystem and in communication with the machine learning subsystem;
a recognition subsystem in communication with the machine learning subsystem;
a new weapons and subjects subsystem in communication with the machine learning subsystem; and
a deep learning subsystem in communication with the new weapons and subjects subsystem and in communication with the database.

3. The system of claim 1, wherein the optical subsystem comprises:
a detector;
a beam-steerer operably coupled to the detector, wherein the beam-steerer is a metamaterial layer;
a beam-former operably coupled to the detector and operably coupled to the beam-steerer.

4. The system of claim 3, wherein the optical subsystem further comprises Light Detection and Ranging (LiDAR) system integrated with the beam-former, the LiDAR system operable to send a beam generated by the optical subsystem and to receive a reflected beam.

5. The system of claim 1, wherein the NLRB non-lethal reactive deterrence defense subsystem comprises:
a source operable to operate at 95 Gigahertz (GHz) and form a beam of energy at 95 GHz;
a beam-former operably coupled to the source, wherein the beam-former is a metamaterial layer; and
a beam-steerer operably coupled to the beam-former, wherein the beam-steerer is a metamaterial layer and wherein the beam-steerer is operable to direct the beam of energy to the actor.

6. The system of claim 1, wherein the acoustic subsystem comprises:
a detector and source, a beam-former operably coupled to the detector and source, wherein the beam-former is a metamaterial layer; and a beam-steerer operably coupled to the beam-former, wherein the beam-steerer is a metamaterial layer and is operable to direct at least one acoustic signal to the actor.

7. A method of deterring an actor in a public area, the method comprising:
receiving at least one of an optical data through an optical subsystem and an acoustic data through an acoustic subsystem;
sending the at least one of the optical data and the acoustic data to a computer system;
receiving, at the computer system, the at least one of the optical data and the acoustic data;
processing the at least one of the optical data and the acoustic data;
determining, at the computer system, a threat level to the public area by the at least one of the optical data and the acoustic data to the public area, wherein the determining comprises:
comparing the at least one of the optical data and the acoustic data to known optical data and known acoustic data stored in a database accessible by the computer system;
recognizing any matches between the at least one of the optical data and the acoustic data and the known optical data and the known acoustic data stored in the database accessible by the computer system;
assigning a first threat level to the matches of the at least one of the optical data and the acoustic data based on the recognized matches;
determining an appropriate response based on the first threat level; and
upon determining the appropriate response, sending an instruction, by the computer system, the instruction containing the appropriate response, to at least one of the acoustic subsystem and a non-lethal reactive deterrence defense subsystem to carry out the instruction, wherein sending the instruction further comprises:
sending the instruction, by the computer system, the instruction containing the appropriate response, to at least one of a control subsystem and a beam-steering computer, wherein each of the control subsystem and the beam-steering computer is in communication with the computer system;
translating the instruction, by the at least one of a control system and the beam-steering computer, to an executable command; and
sending the executable command, by the at least one of the control subsystem and the beam-steering computer, to at least one of the acoustic subsystem and the non-lethal reactive deterrence defense system, wherein at least one of the acoustic subsystem and the non-lethal reactive deterrence defense system executes the executable command.

8. The method of claim 7, wherein the determining further comprises:
recognizing non-matches between the at least one of the optical data and the acoustic data and the known optical data and the known acoustic data stored in the database accessible by the computer system;
for any non-matches, further comparing non-matches to the known optical data and the known acoustic data and determining a level of similarity between the non-matches and the known optical data and the known acoustic data;
assigning a second threat level to the non-matches of the at least one of the optical data and the acoustic data;
determining the appropriate response based on at least one of the first threat level or the second threat level;
sending the instruction, by the computer system, the instruction containing the appropriate response, to the control subsystem in communication with the computer system;
translating the instruction, by the control system, to an executable command; and
sending the executable command, by the control subsystem to at least one of the acoustic subsystem and the non-lethal reactive deterrence defense system, wherein at least one of the acoustic subsystem and the non-lethal reactive deterrence defense system executes the executable command.

9. The method of claim 8, wherein receiving the acoustic data comprises:
receiving the acoustic data from the acoustic subsystem, the acoustic subsystem comprising:
a detector operable to detect an incoming acoustic beam;
a source next to the detector, the source operable to generate an acoustic beam;
a beam-former operably coupled to the detector and source, wherein the beam-former is a metamaterial layer; and
a beam-steerer operably coupled to the beam-former, wherein the beam-steerer is a metamaterial layer and is operable to direct at least one acoustic signal to the actor;
wherein an initial received acoustic beam is broad, and further wherein a subsequent received acoustic beam is narrowed, narrowing onto a location of a potential threat.

10. The method of claim 7, wherein determining the threat level to the public area by the acoustic data further comprises the computer system assigning the threat level by at least one of:
analyzing spoken words;
analyzing a volume of the spoken words and changes in the volume of the spoken words;
analyzing changes in an intonation of the spoken words and changes in the intonation of the spoken words; and
identifying the actor by comparing the acoustic data containing the actor's voice to voice prints stored in the database.

11. The method of claim 10, wherein the instruction comprises an instruction to the acoustic subsystem to direct a focused narrow acoustic beam at the actor.

12. The method of claim 11, wherein the audio signal is operable to perform one of deterring aggressive behavior, instructing the actor to lay down all weapons, and instructing the actor(s) to move to a safe zone.

13. The method of claim 8, further comprising the computer system notifying law enforcement officials of a threat.

14. The method of claim 7, wherein receiving the optical data comprises:
receiving the optical data from the optical subsystem, the optical subsystem comprising:
a source operable to generate an optical beam;
a beam-former operably coupled to the detector and source, wherein the beam-former is a metamaterial layer; and
a beam-steerer operably coupled to the beam-former, wherein the beam-steerer is a metamaterial layer and is operable to direct at least one acoustic signal to the actor.

15. The method of claim 14, wherein determining the threat level to the public area by the optical data further comprises the computer assigning the threat level by at least one of:
- analyzing optical data of the actor collected from the optical subsystem;
- analyzing optical data of objects collected from the optical subsystem;
- analyzing visual interactions between multiple actors; and
- identifying the actor by comparing an image of the actor's face to identified images stored in the database.

16. The method of claim 8, wherein the non-lethal reactive deterrence defense subsystem comprises:
- a source operable to operate at 95 Gigahertz (GHz) and form the beam of energy at 95 GHz;
- a beam-former operably coupled to the source, wherein the beam-former is a metamaterial layer; and
- a beam-steerer operably coupled to the beam-former, wherein the beam-steerer is a metamaterial layer and wherein the beam-steerer is operable to direct the beam of energy to the actor.

17. The method of claim 16, wherein the instruction comprises an instruction to the non-lethal reactive deterrence defense subsystem to direct beam of energy at the actor.

* * * * *